United States Patent
Merchant et al.

(10) Patent No.: US 12,491,533 B2
(45) Date of Patent: Dec. 9, 2025

(54) ADHESIVE DISPENSING SYSTEMS AND METHODS

(71) Applicant: 3M INNOVATIVE PROPERTIES COMPANY, St. Paul, MN (US)

(72) Inventors: John A. Merchant, Apple Valley, MN (US); Brianna L. McCord, Shoreview, MN (US); Alissa P. Wenner, Woodbury, MN (US); Aline Serrao De Filippo, Falcon Heights, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 183 days.

(21) Appl. No.: 18/570,373

(22) PCT Filed: Jun. 15, 2022

(86) PCT No.: PCT/IB2022/055553
§ 371 (c)(1),
(2) Date: Dec. 14, 2023

(87) PCT Pub. No.: WO2022/264065
PCT Pub. Date: Dec. 22, 2022

(65) Prior Publication Data
US 2024/0286166 A1  Aug. 29, 2024

Related U.S. Application Data

(60) Provisional application No. 63/268,780, filed on Mar. 2, 2022, provisional application No. 63/211,204, filed on Jun. 16, 2021.

(51) Int. Cl.
*B05C 11/10* (2006.01)
*G05D 7/06* (2006.01)

(52) U.S. Cl.
CPC ........ *B05C 11/1007* (2013.01); *G05D 7/0676* (2013.01)

(58) Field of Classification Search
CPC ............ B05C 11/1007; B05C 11/1044; G05D 7/0676
See application file for complete search history.

(56) References Cited

U.S. PATENT DOCUMENTS

| | | | |
|---|---|---|---|
| 3,436,359 A | | 4/1969 | Hubin et al. |
| 4,667,852 A | * | 5/1987 | Siemann ................ B05C 11/02 222/54 |

(Continued)

FOREIGN PATENT DOCUMENTS

| | | |
|---|---|---|
| CA | 2619330 C | 3/2011 |
| CN | 101825870 B | 1/2013 |

(Continued)

OTHER PUBLICATIONS

Gerhart, Fundamentals of Fluid Mechanics, 14-18, 2016.

(Continued)

*Primary Examiner* — Vishal Pancholi
(74) *Attorney, Agent, or Firm* — Vincent Pham

(57) ABSTRACT

Apparatus, systems (400), and methods for predicting a parameter of dispenser system, dispensing a dispensable material, calibrating a dispenser system are described. Apparatus and systems can use machine learning algorithms based on environmental variables and other factors in a system where the adhesive dispenser (100) is used. Furthermore, apparatus and systems can adjust an operational parameter of the dispenser system based on at least one process parameter. Still further, apparatus and systems can provide one or more settings for one or more dispenser components based on a calibration model. Algorithms (412) can operate on remote or local software and control systems, (Continued)

or as part of an edge computing system or Internet of Things (IoT) system.

18 Claims, 13 Drawing Sheets

(56) References Cited

U.S. PATENT DOCUMENTS

| | | | |
|---|---|---|---|
| 4,833,213 | A | 5/1989 | Leir et al. |
| 5,211,932 | A | 5/1993 | Blaylock et al. |
| 5,798,409 | A | 8/1998 | Ho |
| 6,258,918 | B1 | 7/2001 | Ho et al. |
| 6,591,620 | B2 | 7/2003 | Kikuchi et al. |
| 6,799,078 | B1 | 9/2004 | Berkooz et al. |
| 7,127,358 | B2 | 10/2006 | Yue et al. |
| 7,160,421 | B2 | 1/2007 | Wilson et al. |
| 7,189,318 | B2 | 3/2007 | Wilson et al. |
| 7,225,171 | B2 | 5/2007 | Kikuchi et al. |
| 7,622,308 | B2 | 11/2009 | Hendler et al. |
| 7,822,586 | B2 | 10/2010 | Wu et al. |
| 7,853,339 | B2 | 12/2010 | Miller et al. |
| 7,853,431 | B2 | 12/2010 | Samardzija et al. |
| 7,917,240 | B2 | 3/2011 | Samardzija |
| 7,937,164 | B2 | 5/2011 | Samardzija et al. |
| 7,966,149 | B2 | 6/2011 | Samardzija et al. |
| 7,996,102 | B2 | 8/2011 | Hendler et al. |
| 8,014,880 | B2 | 9/2011 | Samardzija et al. |
| 8,271,122 | B2 | 9/2012 | Byrne et al. |
| 8,489,360 | B2 | 7/2013 | Lundeberg et al. |
| 9,051,163 | B2 | 6/2015 | Mehus et al. |
| 9,110,452 | B2 | 8/2015 | Blevins et al. |
| 9,527,683 | B2 | 12/2016 | Drebinger |
| 10,613,553 | B2 * | 4/2020 | van der Merwe .... F16K 31/003 |
| 11,549,502 | B2 * | 1/2023 | van der Merwe .... F16K 31/082 |
| 12,286,966 | B2 * | 4/2025 | van der Merwe .... F16K 11/044 |
| 2014/0017142 | A1 | 1/2014 | Mehus et al. |
| 2014/0080940 | A1 | 3/2014 | Lee et al. |
| 2014/0273847 | A1 | 9/2014 | Nixon et al. |
| 2014/0274123 | A1 | 9/2014 | Nixon et al. |
| 2014/0277593 | A1 | 9/2014 | Nixon et al. |
| 2014/0277594 | A1 | 9/2014 | Nixon et al. |
| 2014/0277595 | A1 | 9/2014 | Nixon et al. |
| 2014/0277596 | A1 | 9/2014 | Nixon et al. |
| 2014/0277605 | A1 | 9/2014 | Nixon et al. |
| 2014/0277607 | A1 | 9/2014 | Nixon et al. |
| 2014/0277615 | A1 | 9/2014 | Nixon et al. |
| 2014/0277616 | A1 | 9/2014 | Nixon et al. |
| 2014/0277617 | A1 | 9/2014 | Nixon et al. |
| 2014/0277618 | A1 | 9/2014 | Nixon et al. |
| 2014/0280497 | A1 | 9/2014 | Nixon et al. |
| 2014/0282015 | A1 | 9/2014 | Nixon et al. |
| 2014/0282257 | A1 | 9/2014 | Nixon et al. |
| 2016/0363913 | A1 | 12/2016 | Pfeiffer et al. |
| 2019/0362845 | A1 | 11/2019 | Kozloski et al. |
| 2020/0006100 | A1 | 1/2020 | Clark et al. |
| 2020/0010336 | A1 | 1/2020 | Montestruque et al. |
| 2020/0043764 | A1 | 2/2020 | Clark et al. |
| 2020/0083070 | A1 | 3/2020 | Clark et al. |
| 2020/0083074 | A1 | 3/2020 | Clark et al. |
| 2020/0083080 | A1 | 3/2020 | Clark et al. |

FOREIGN PATENT DOCUMENTS

| | | |
|---|---|---|
| CN | 106168759 A | 11/2016 |
| CN | 107908111 B | 4/2021 |
| DE | 102004026642 B4 | 10/2006 |
| EP | 1295312 A2 | 3/2003 |
| EP | 1259860 B1 | 3/2004 |
| EP | 3104240 A1 | 12/2016 |
| EP | 2911776 B1 | 8/2020 |
| EP | 3722895 A1 | 10/2020 |
| EP | 2376783 B2 | 11/2020 |
| EP | 3593211 B1 | 8/2023 |
| EP | 3442351 B1 | 11/2023 |
| JP | 2950695 B2 | 9/1999 |
| JP | 2002287802 A | 10/2002 |
| JP | 2005242524 A | 9/2005 |
| JP | 3812358 B2 | 8/2006 |
| JP | 2014039893 A | 3/2014 |
| KR | 101242507 B1 | 3/2013 |
| WO | 200157605 A1 | 8/2001 |
| WO | 200191163 A2 | 11/2001 |
| WO | 2005103997 A2 | 11/2005 |
| WO | 2006023041 A2 | 3/2006 |
| WO | 2008042739 A2 | 4/2008 |
| WO | 2008042757 A2 | 4/2008 |
| WO | 2008042758 A2 | 4/2008 |
| WO | 2008042759 A2 | 4/2008 |
| WO | 2008042786 A2 | 4/2008 |
| WO | 2008042807 A2 | 4/2008 |
| WO | 2008042809 A2 | 4/2008 |
| WO | 2009114251 A1 | 9/2009 |
| WO | 2010072803 A1 | 7/2010 |
| WO | 2013013974 A2 | 1/2013 |
| WO | 2014068232 A1 | 5/2014 |
| WO | 2017177417 A1 | 10/2017 |
| WO | 2018165349 A1 | 9/2018 |
| WO | 2019182913 A1 | 9/2019 |
| WO | 2019182952 A1 | 9/2019 |
| WO | 2019183035 A1 | 9/2019 |
| WO | 2020028505 A1 | 2/2020 |
| WO | 2020064506 A1 | 4/2020 |
| WO | 2020207893 A1 | 10/2020 |
| WO | 2021074744 A1 | 4/2021 |
| WO | 2022013786 A1 | 1/2022 |

OTHER PUBLICATIONS

Gerhart, Fundamentals of Fluid Mechanics, 407-411, 2016.
International Search Report for PCT International Application No. PCT/IB2022/056333, mailed on Jan. 17, 2023, 4 pages.

* cited by examiner

510

512 — Lot Number:
7138AT

514 — Pressure (PSI):
50

516 — Mass dispensed (g):
1.0142

518 — Time to dispense (s):
5

520 — Temperature (C°):
25

522 — Delete Data Point

524 — Add Data Point | Done

FIG. 5B

ADHESIVE DISPENSING SYSTEMS AND METHODS

CROSS REFERENCE TO RELATED APPLICATIONS

This application is a national stage filing under 35 U.S.C. 371 of PCT/IB2022/055553, filed Jun. 15, 2022, which claims the benefit of U.S. Provisional Application Nos. 63/211,204, filed Jun. 16, 2021, and 63/268,780, filed Mar. 2, 2022, the disclosures of which are incorporated by reference in their entireties herein.

BACKGROUND

Systems for dispensing adhesives typically include an inlet or internal area for holding the adhesive, and an output or tip through which adhesive is dispensed to a surface. The flow rate of the adhesive can be directly controlled to meet needs of downstream manufacturing processes by using metering systems. However, systems that actively control the flow rate can be overly complex and expensive for most users. Indirect methods can use calibration curves to provide or recommend settings based on different variables such as air pressure, pump settings, time for application, total volume dispensed, or other variables. However, such calibration curves can become overly complex given the number of adhesives, varying temperatures, and chemical reactions that can occur throughout a dispensing process. Other systems involving neural networks can learn or predict settings, but these require hundreds or thousands of calibration points to become useful. Therefore, there is a general need to more accurately predict dispenser settings and other dispensing parameters, in a timely and cost-effective manner.

SUMMARY OF THE DISCLOSURE

In one aspect, the present disclosure provides an apparatus comprising memory to store data indicating at least one parameter of an adhesive dispensing system. The apparatus further comprises a processor coupled to the memory. The processor is configured to retrieve the at least one parameter. The processor is further configured to determine a value for an operational parameter of the adhesive dispensing system, based on the at least one parameter, that will achieve a flow rate of an adhesive in the adhesive dispensing system. The processor is further configured to provide the operational parameter to the adhesive dispensing system.

The at least one parameter can relate to viscosity of an adhesive in the adhesive dispensing system. The operational parameter can include driving force pressure for the adhesive dispensing system. The processor can be configured to determine driving force pressure based on viscosity of the adhesive and on parameters specific to the adhesive dispensing system, according to a relationship between pressure and viscosity p. The relationship can include constants determined based on a non-neural network machine learning algorithm. The relationship can include constants determined based on a hybrid algorithm comprised of a neural network portion and a non-neural network machine learning algorithm. Similar methods and systems are also described.

In another aspect, the present disclosure describes a dispenser system including one or more dispenser components and a processor operatively coupled to the one or more dispenser components. The one or more dispenser components includes one or more sensors for providing at least one process parameter of a dispensable material. The one or more sensors include a temperature sensor including a probe arranged in a fluid path of the dispensable material and configured to sense a temperature of the dispensable material. The processor is configured to receive at least one parameter associated with the dispenser system; determine a value for an operational parameter of the dispenser system, based on the at least one parameter, that will achieve a flow rate of a dispensable material in the dispenser system; and provide the operational parameter. The processor is further configured to receive the temperature of the dispensable material from the temperature sensor, adjust the value for the operational parameter of the dispenser system based on the sensed temperature, and provide the adjusted operational parameter.

In another aspect, the present disclosure describes a method of dispensing a dispensable material using a dispenser system. The method including receiving at least one parameter associated with the dispenser system; determining a value for an operational parameter of the dispenser system, based on the at least one parameter, that will achieve a flow rate of the dispensable material in the dispenser system; providing the operational parameter; receiving at least one process parameter comprising a sensed temperature of the dispensable material; adjusting the value for the operational parameter of the dispenser system based on the sensed temperature; and providing the adjusted operational parameter.

In another aspect, the present disclosure describes a dispenser system including one or more dispenser components configured to provide a dispensable material and a processor operatively coupled to the one or more dispenser components. The processor is configured to receive a plurality of calibration data points of the dispenser system and one or more parameters of the one or more dispenser components. The plurality of calibration data points are based on a plurality of dispensed samples of the dispensable material. The processor is further configured to select one or more predetermined models based on the one or more parameters of the dispenser components, determine a calibration model based on the plurality of calibration data points and the one or more models, and adjust one or more settings of the one or more dispenser components based on the calibration model.

In another aspect, the present disclosure describes a method for calibrating a dispenser system. The method including receiving a plurality of calibration data points of the dispenser system and one or more parameters of dispenser components of the calibration system, the plurality of calibration data points based on a plurality of dispensed samples of a dispensable material; selecting one or more predetermined models based on the one or more parameters of the dispenser components; determining a calibration model based on the plurality of calibration data points and the one or more predetermined models; and providing one or more settings for the dispenser system based on the calibration model.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

BRIEF DESCRIPTION OF FIGURES

FIG. 5B illustrates an example GUI for manual entry of calibration data in accordance with some embodiments.

DETAILED DESCRIPTION OF ILLUSTRATIVE EMBODIMENTS

Figure 1:
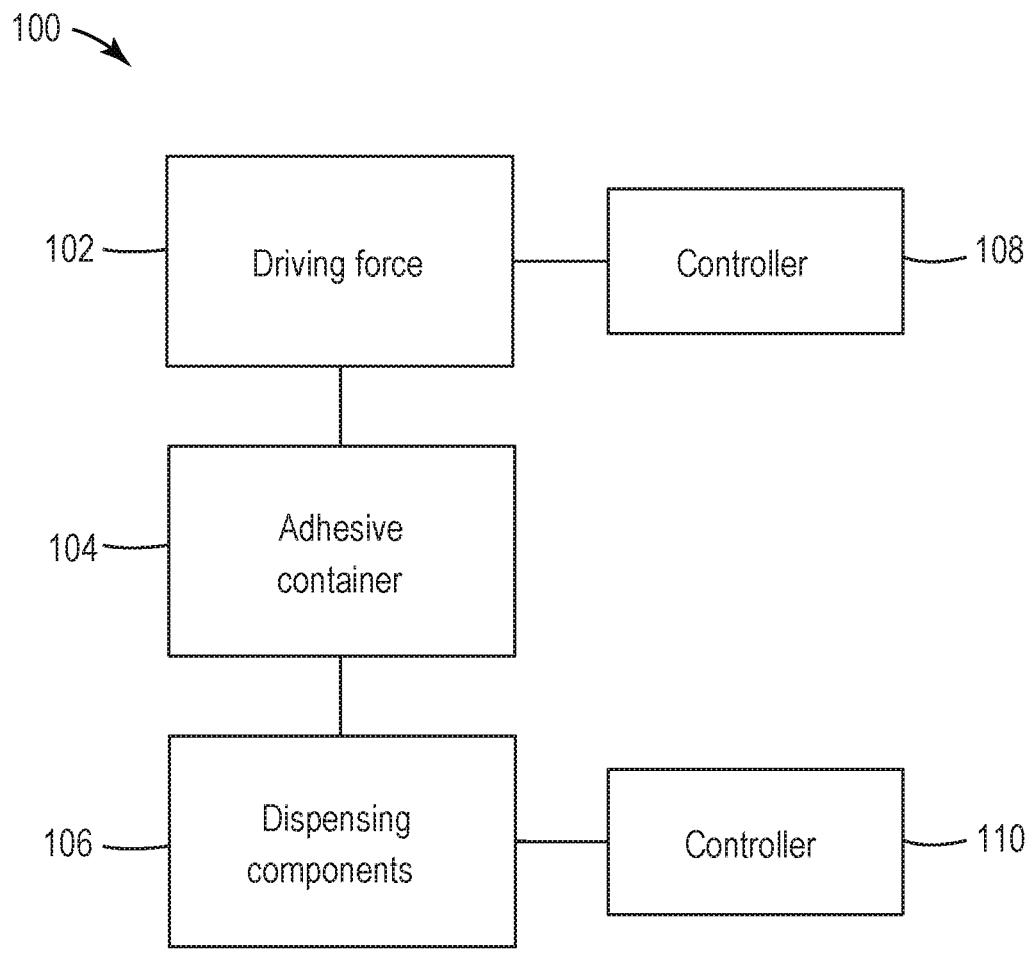
FIG. 1 is a block diagram of an adhesive dispenser in which example embodiments can be implemented.

Adhesive dispensers provide liquid adhesives, through a tip or nozzle, to a surface or substrate as part of a manufacturing process. FIG. 1 is a block diagram of an adhesive dispenser 100. The adhesive dispenser is configured to deliver liquid adhesive from a source of liquid adhesive 104 to dispensing components 106 using a driving force 102, such that the liquid adhesive may be dispensed on demand using the dispensing components 106. Operators can use various settings or parameters with the adhesive dispenser, including using controllers 108 or 110 to dispense adhesive at a desired flow rate. These settings or parameters can vary depending on a number of factors, and it can be difficult to predict settings that will work for any particular combination of factors.

Figure 2:
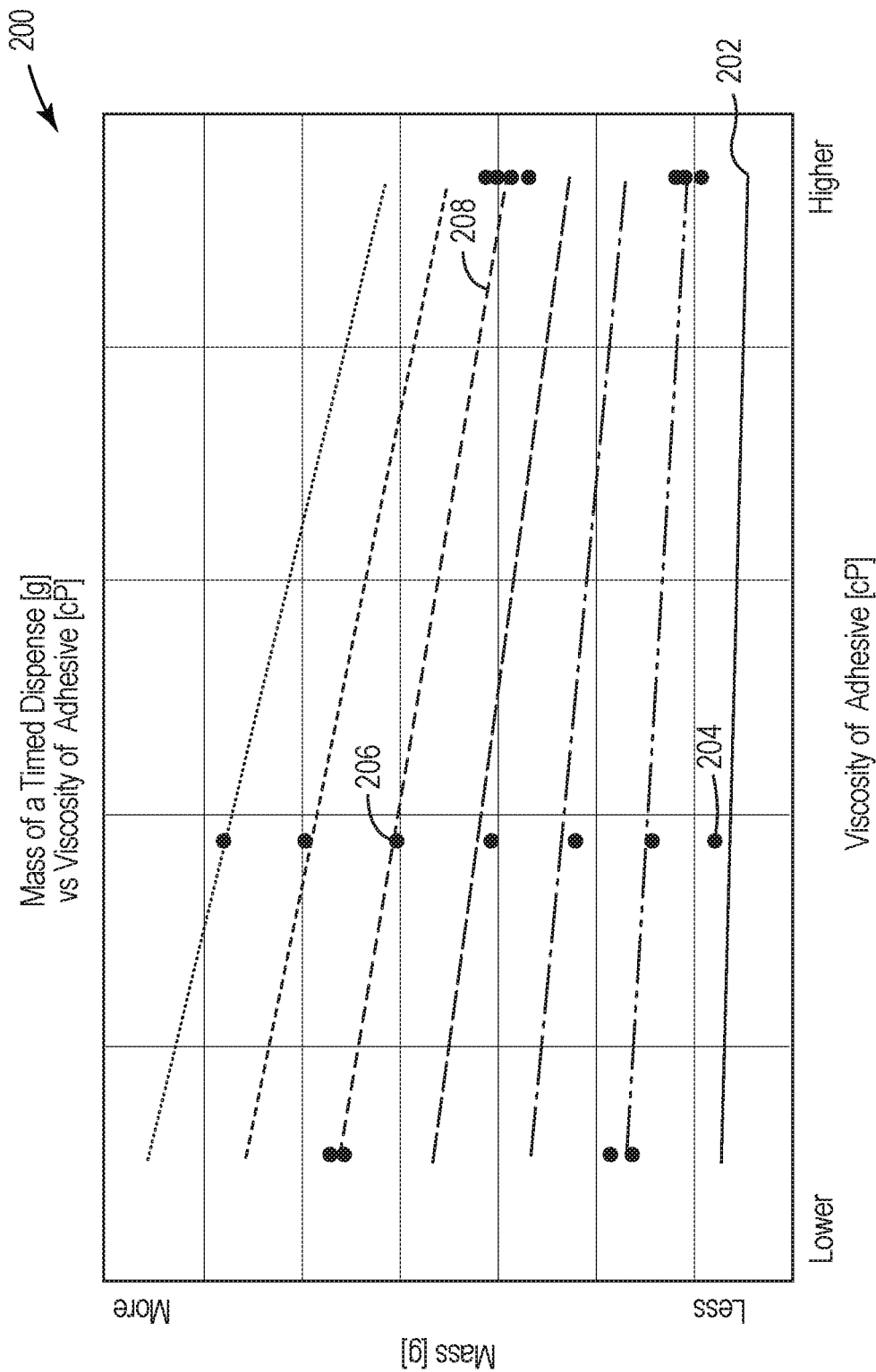
FIG. 2 is a linear calibration curve for determining flow rate for an adhesive dispenser.

Calibration curves can be used to predict or recommend adhesive dispenser 100 settings, given the viscosity or other identifying information of the adhesives being used. FIG. 2 illustrates linear calibration curves 200. In the example curves 200, mass of adhesive dispensed per unit time can be mapped based on viscosity of the adhesive. The mass dispensed will vary with driving force 102 pressure and adhesive viscosity. The amount dispensed can be predicted by linear curves. For example, as seen by curve 202, given a low pressure at the driving force 102 controller 108, less and less mass of adhesive is dispensed as the viscosity increases.

However, measurements taken of actual dispensed mass may not exactly fit such curves. For example, as seen at curve 202, actual dispensed mass shown by measurement 204 is above the curve 202. Another measurement 206 may be closer to the predicted linear curve 208. Therefore, a linear fit only gives rough predictions.

Other systems based on neural networks can be used to control instructions for applying adhesives. However, neural network-based systems require hundreds, or even thousands of calibration points to be useful, and there is substantial learning that must take place before any control of adhesive dispensing is possible.

Systems and Algorithms for Adhesive Dispensing

Figure 4:
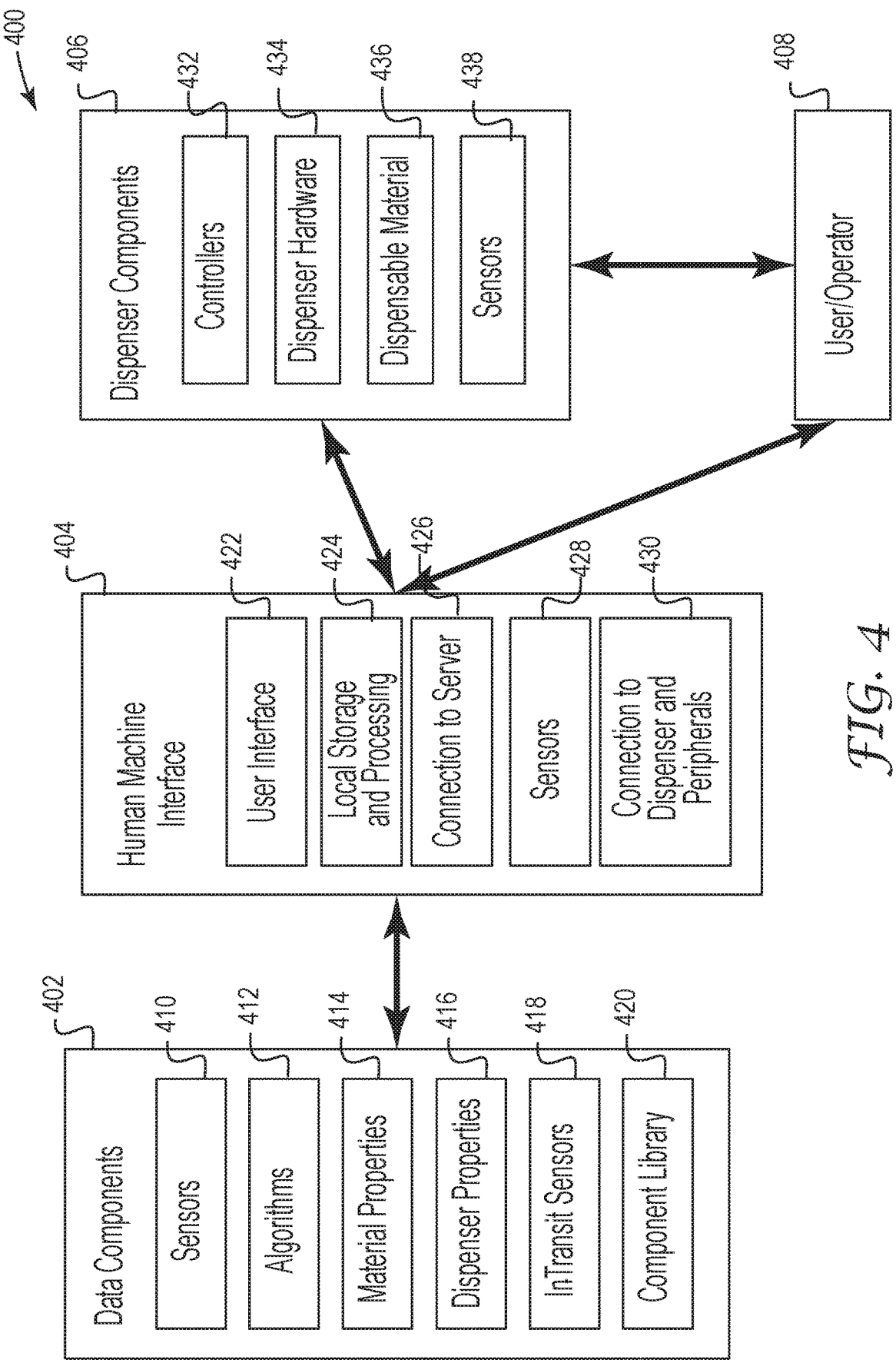
FIG. 4 is a system for predicting a flow rate adjusting for multiple variables in accordance with some embodiments.

To account for these and other complexities, systems, methods, and apparatus according to various embodiments use machine learning to predict dispenser settings or other parameters for accurate, adaptable adhesive dispensing that work well with downstream manufacturing processes according to the needs of operators. Predictions can be based on any data relating to adhesives or adhesive dispensing processes. FIG. 4 is a system 400 for predicting a flow rate adjusting for multiple variables in accordance with some embodiments.

Referring to FIG. 4, the system 400 can include data components 402. The data components 402 can include inputs, for example user inputs, received from human machine interface 404. Further, the data components 402 can include outputs provided for display to the human machine interface 404. The human machine interface 404 can in turn provide inputs and receive outputs from dispenser components 406. Additionally, the human machine interface 404 can provide data including visual and audio indicators to a human operator 408 and receive inputs such as keyboard entries, etc. from the human operator 408. The human operator 408 can interact with the dispenser components 406 by for example by changing settings or parameters of the dispenser components 406.

Data components 402 can include sensor data 410. Sensor data 410 can include, for example, rheologic data about the calibration liquid and the adhesive to be dispensed; data about the manufacturing of the adhesive, including in-plant measurements; environmental parameters or conditions (as provided by sensor 428); and lot information, cartridge information, or other information that can identify a batch of adhesive. Data components 402 can include material properties 414 of adhesives and dispenser properties 416. Sensors 418 can include data about the adhesive during the supply chain process, including the temperatures the adhesive has been subjected to or humidity, and the amount of time through which extreme temperature or humidity conditions were present. Data components 402 can further include data 420 regarding different modular components of adhesive dispensers 100.

Data components 402 can further include algorithms 412 such as machine learning algorithms, curve fitting algorithms, minimization, and optimization functions, etc. Algorithms 412 according to embodiments can generate predictions based on data associated with a calibration liquid. A calibration liquid can include a model of a liquid, an ideal liquid, or a special calibration liquid used only for calibration processes and not, for example, in production processes. In any case, the calibration liquid shall be dispensed using, for example, adhesive dispenser 100. In examples, input data can include any of the data described above, in addition to data input by a user or another system, such as machine calibration data or dispenser calibration data. In some examples temperature or humidity sensors, or other sensors in the room or area where adhesive dispensing is taking place or will take place, can provide inputs to the algorithms 412.

As mentioned earlier herein, the relationship between mass, viscosity and pressure of adhesive may be nonlinear, creating complexity in determining or predicting a proper pressure at which to dispense adhesive. Equations or relationships can be developed to illustrate a nonlinear relationship between pressure and viscosity. An example Equation (1) can be used to generalize this nonlinear relationship:

$$m = G(F1(p), F2(\mu)...) \qquad (1)$$

where m is the mass of adhesive dispensed, F1 is a function of pressure p, and F2 is a function of viscosity μ. Other functions and relationships can be included, and Equation (1) should not be understood as limiting embodiments to a relationship between pressure and viscosity. Constants within those relationships are solved-for using machine learning algorithms as described herein. The constants can vary with environmental conditions or other conditions, and in some embodiments different constants will be obtained in different iterations of machine learning algorithms.

Figure 3:
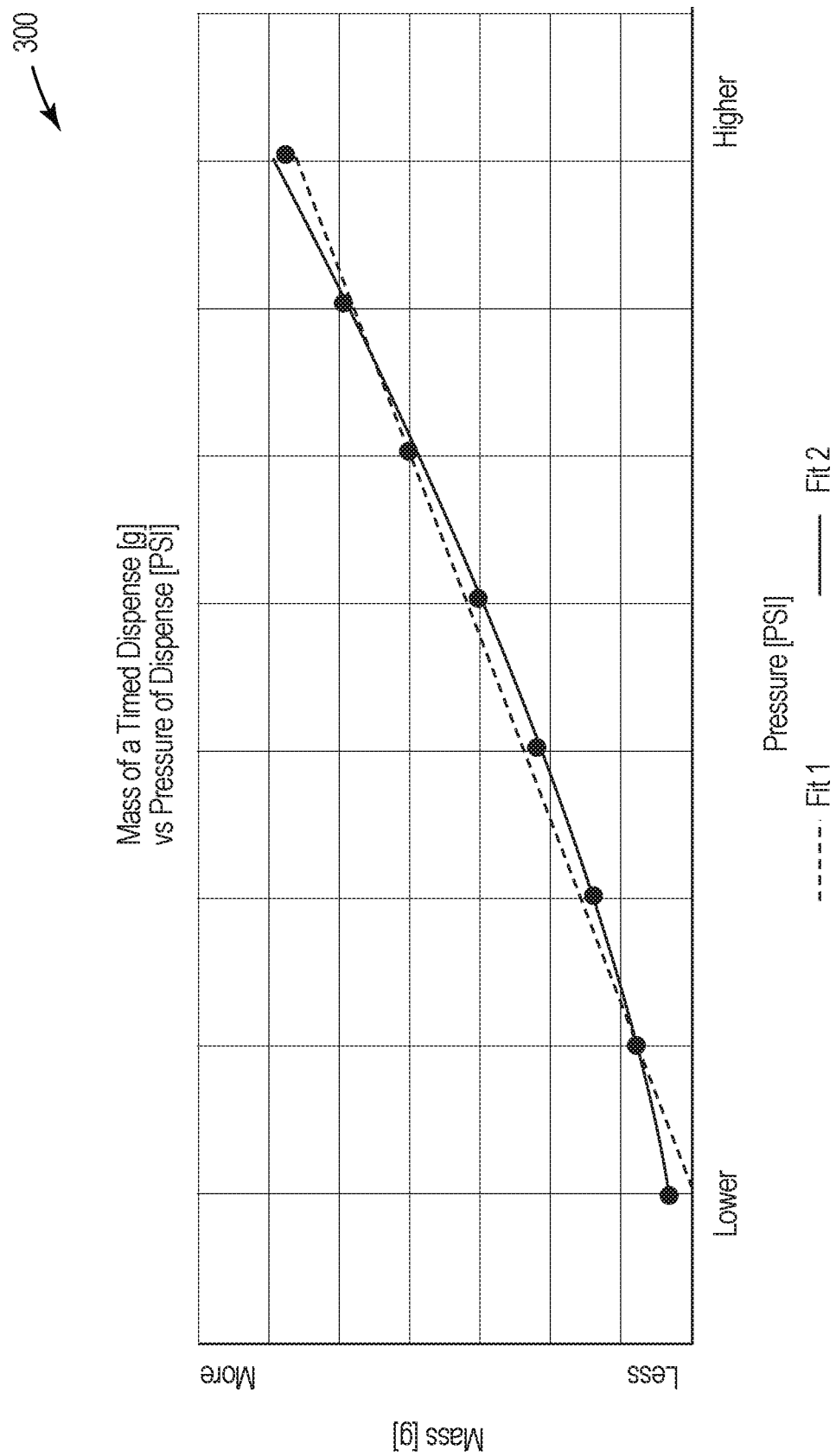
FIG. 3 is a nonlinear calibration curve for determining flow rate for an adhesive dispenser.

From Equation (1) or similar equations, a nonlinear fit can be provided as in FIG. 3. However, this adds mathematical complexity to the prediction process. Further, other variables can add dimensions to the prediction, increasing complexity. For example, if temperature is taken into account, the predictions will become three-dimensional with three variables (e.g., temperature, mass, and pressure) and modeling will become increasingly difficult using calibration curves. Chemical reactions within the adhesive or between the adhesive parts, whether during storage or during the dispensing process, can further add to the difficulty of developing accurate calibration curves that will be applicable in real-world conditions.

Algorithms 412 can generate predictions based on Equation (1). In some example embodiments, with reference to Equation (1), constants related to F1 and F2 can be solved for using, for example, machine learning algorithms or by solving optimization problems as described later herein. The constants can include dispenser-specific constants or adhesive specific constants that are calculated for each adhesive dispenser 100 and can change with time or temperature. Viscosity p can be determined based on direct or indirect measurement, polynomial fit, numerical regression, or an equation such as Andrade's equation for viscosity of liquids, provided in Equation (2):

$$\mu = De^{\frac{E}{T}} \qquad (2)$$

Where T is temperature and D, and E are constants to be solved for.

As mentioned above, constants related to Equation (1) and constants D and E can be calculated with machine learning algorithms, or by solving optimization problems, for example. Such algorithms can estimate viscosity (or receive a value indicating an estimate of viscosity) based on age of the adhesive, for example, and apply this estimate to values for D or E. Some constants can be calculated based on a machine learning algorithm that minimizes a loss function. The loss function can have input parameters related to at least one of pressure, mass, volume, time and temperature of an adhesive, adhesive dispenser, or process associated with adhesive application.

Quality of the model and of any predictions made can be estimated using, for example, a root mean square error algorithm that compares predicted values to measured values for various parameters including mass dispensed, pressure, temperature, viscosity, etc. Based on the determined constants, the mass to be dispensed, and the environmental temperature and humidity, pressures, or settings at which adhesive should be dispensed are provided to the human machine interface 404.

Still referring to FIG. 4, the human machine interface 404 can include a user interface 422, local storage and processing 424, a connection to server/s 426, sensors 428 and a connection 430 to dispenser 406. The sensors 428 can include ambient temperature and humidity sensors. The human machine interface 404 can further include two-dimensional (2D) barcode scanners or QR barcode scanners to scan lot information or other identifying information of adhesive or of adhesive containers, for example. Some components of the human machine interface 404 are described in more detail later herein with respect to FIGS. 7-8.

Through the connection 430, the human machine interface 404 can communicate with the controller 432 of the dispenser components 406. Pressures or settings predicted by the algorithms 412 can then be used by the controllers 432 to control dispenser hardware 434. For example, the controllers 432 can control the dispenser hardware 434 (e.g., same, or similar to driving force 102) to dispense dispensable material 436 at a pressure as predicted or indicated by the algorithms 412. The dispenser components 406 can include additional sensors 438.

In addition to predicting an ideal pressure at which to dispense adhesive, the machine learning model described above can predict or suggest other settings for remedying adhesive processes or providing an adhesive flow rate to meet needs of downstream processes. These suggestions can be provided through various human interface elements as described later herein.

Feedback

Feedback can be used to incorporate new experience into subsequent machine learning iterations. Data provided via feedback can indicate quality of the dispensing process or processes associated with the dispensing process. Data can further include qualitative data regarding, for example, the achieved flow rate. In some example embodiments, data can be provided by a human operator through indication, through the human machine interface 404, smartphones, etc., that adhesive dispensing proceeded as expected, through visual inspection or other observation.

In other example embodiments, machine sensors 438, including for example machine vision sensors, mass sensors, etc. or any device capable of detecting heat, humidity, weight, mass, adhesive quality, volume, bead profile, etc. may be used as sources of feedback information. Regardless of whether feedback data is provided through a human interface or through machine-based sensors 438, algorithms 412 can use the provided data to refine the constants used in the algorithms 412.

Suggested Data Capture

Figure 5A:
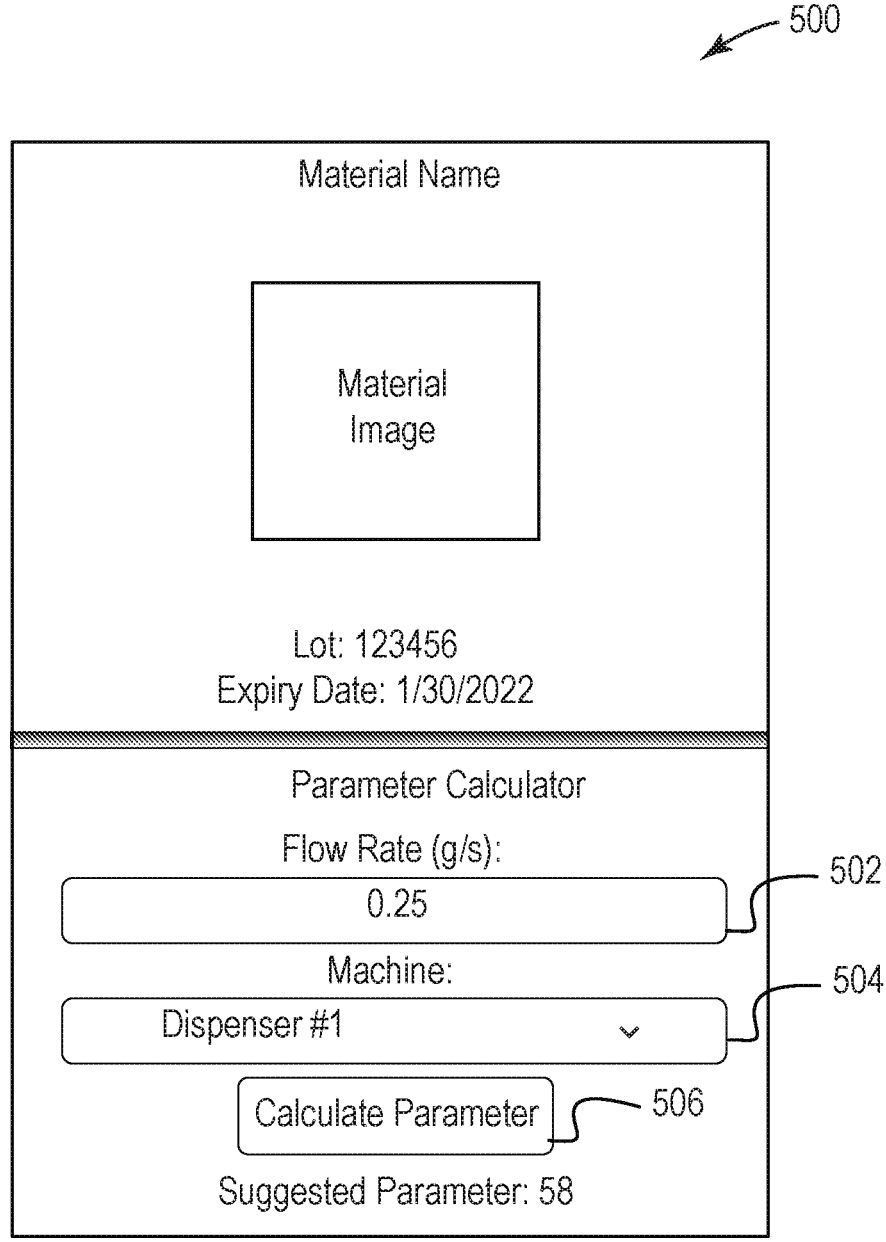
FIG. 5A illustrates an example graphical user interface (GUI) in accordance with some embodiments.

Predictions and suggestions can be provided on a user interface, for example the graphical user interface (GUI) 500. FIG. 5A illustrates an example GUI 500 in accordance with some embodiments.

The GUI 500 can be provided by a smart phone or other user device, or by a standalone device associated with the human machine interface 404 or any component of systems described later herein with respect to FIGS. 7 and 8. The GUI 500 can display information regarding the adhesive being dispensed. Example information can include product name, product color, an image of a tube or other container of the product, lot number and other manufacturing information, and expiration date, among other information.

The GUI 500 can display one or more parameters 502 indicating a desired condition of a dispensing function. For example, the GUI 500 can display a desired flow rate of dispensing. In embodiments, the parameters 502 are user-editable, such that a user can suggest a desired flow rate, mass, or dispensing time based on, for example needs of processes downstream of the adhesive process being controlled. The GUI 500 can display such information for any number of remote or local dispensing machines. In some embodiments, users can switch between different dispensing machines using an interface element 504, such as a drop box, list, or other element.

The GUI 500 can be displayed as part of a web application for providing suggestions for pressure settings or other operational settings of an adhesive dispenser 100 (FIG. 1), wherein such operational settings have been determined using algorithm 412 (FIG. 4). A user can request that a pressure prediction or suggestion be given, instead of or in addition to periodic updates provided by the algorithm 412 (FIG. 4). For example, a user can press an interface element 506, such as a button, and a smart phone or other user device can wirelessly transmit a request that the algorithms 412 execute to provide an updated suggested pressure. A suggested value for a parameter, for example pressure, can be displayed on the GUI 500. In some examples, the user can then manually use the suggested pressure with the adhesive dispenser 100. In other examples, dispenser components 406, including controllers 432 (FIG. 4), can automatically control dispenser hardware 434 based on the suggested pressure.

The machine learning model described above can also predict when current environmental conditions (such as temperature and humidity, although embodiments are not limited thereto) would result in a lower-quality prediction. The GUI 500 can then be used to request or suggest that further calibration points be captured by the user, and to retrieve such calibration points from user input. This can improve the overall machine learning model.

In other example embodiments, if a user requests a flow rate far outside previously requested flow rates, such that application pressure would be much higher than previously used, the user can be notified, either through GUI 500 or audio alarms, etc., that further calibration points should be captured. For example, if the user requests a flow rate that would require a pressure of 50 psi, but a usual dispensing range is 20-40 psi. the user will be requested to provide calibration points related to 50 psi. A calibration point can be as illustrated in FIG. 5B, for example a calibration point can include lot number 512 information, pressure 514 information, mass dispensed 516 information, time to dispense 518 information, and temperature 520 information. In the illustrated example of a 50-psi calibration point, then, the user will provide the information illustrated in FIG. 5B, such as temperature and time to dispense at 50 psi. In examples, a time stamp can be added to this calibration point upon storage by, for example, the human machine interface 404 or associated processing circuitry. Fewer or additional fields can be included in a calibration point in some embodiments.

The models described earlier herein can identify opportunities to strengthen the predictive quality. In at least some example embodiments, suggestions can be generated regarding such opportunities, and displayed on the GUI 500 or other user interface. If an opportunity for prediction improvement is identified, systems and apparatus according to embodiments can indicate to the user, whether through audio or visual alarms or indications, text, voice messages, etc., that the user should capture adhesive data that can lead to prediction improvement.

For example, if the machine learning model determines that flow rate data has not been captured at a particular temperature, a system in accordance with embodiments can request that the user capture dispensing data at that particular temperature. Alternatively, systems in accordance with embodiments can control sensors to capture such data at that temperature. In these and other embodiments, further GUI screens can be provided which a user can interact with to manually enter data related to data points that can enhance machine learning algorithms. In at least these embodiments, some or all data can be automatically entered by dispenser components 406 (FIG. 4) either through wireless communications, near field communications (NFC) or other methods. For example, users can manually enter calibration data in a GUI screen 510 as illustrated in FIG. 5B.

FIG. 5B illustrates an example GUI for manual entry of calibration data in accordance with some embodiments. In the example, a user can enter a lot number 512 identifying a manufacturing lot of liquid adhesive or a manufacturing lot of one of the parts of the liquid adhesive. In other examples, lot number 512 can be provided automatically, for example, by reading of an RFID chip or barcode associated with the dispenser components 406, or by wireless communication from the dispenser components 406. The pressure used can be provided at 514. Mass dispensed can be provided by the dispenser components 406, for example by sensors 438, for automatic or manual entry into field 516. Sensors 438 can also provide feedback data for algorithms 412, including machine learning algorithms. The amount of time to dispense 518 can be entered manually by the user, or controllers 432 can provide such time values, for example. Other parameters that impact pressure prediction can be included or entered, for example temperature 520. Users can delete related data points or add data points using interface buttons 522 and 524, respectively.

In Process Adjustments

Feedback can also be used to adjust various settings while material is dispensed to achieve or maintain operational parameters or performance setpoints. For example, data or process parameters related to changes in viscosity of dispensable material as such material is dispensed can be used to adjust driving force pressure to maintain a desired flow rate. Process parameters can include temperature, conductivity, viscosity, weight, mass, or other parameter of the dispensable material 436 or dispenser components 406 during a dispensing process. Process parameters can be sensed by or determined by sensor data from various sensors such as, for example, sensors 438 of the dispenser components 406. The sensors 438 may include, for example, vision sensors, mass sensors, temperature sensors, conductivity sensors, or any device capable of detecting heat, humidity, weight, mass, material quality, conductivity, or other parameters.

In one or more embodiments, one or more sensors (e.g., sensors 438) may provide at least one process parameter of the dispensable material. The at least one process parameter may include, for example, temperature, conductivity, viscosity, weight, mass, or other parameter of the dispensable material (e.g., adhesives, sealants, thermal pastes, etc.). The one or more sensors 438 may include a sensor that can sense a temperature and/or a conductivity of dispensable material, for example, sensor(s) 910 of FIG. 10.

Figure 10:
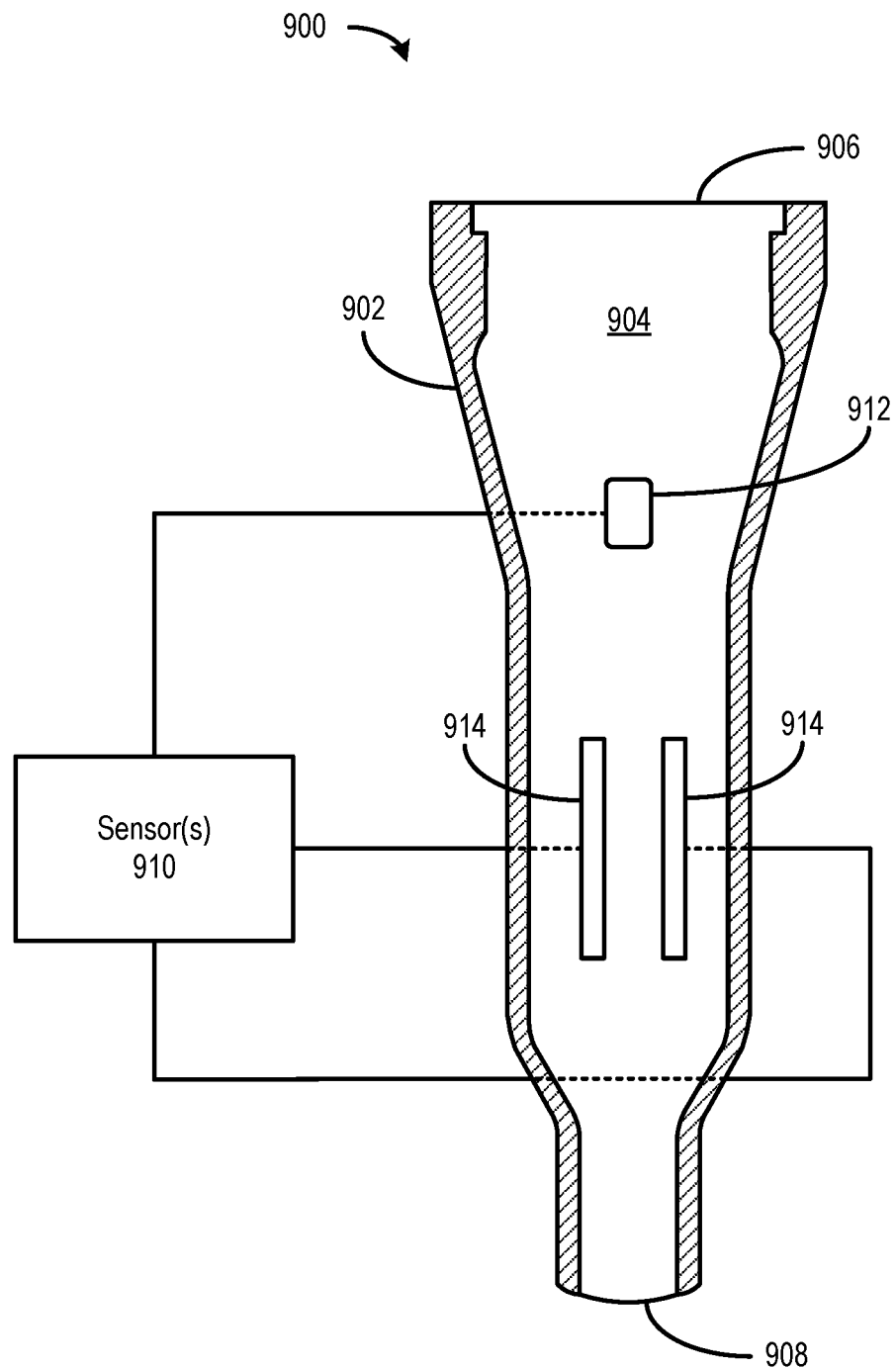
FIG. 10 is a schematic diagram of feedback sensors in accordance with some embodiments.

FIG. 10 illustrates an example of one or more sensors 910 that can sense a temperature and/or a conductivity of dispensable material as it flows through a duct piece 900 (e.g., dispenser components 406 or dispenser hardware 434 of FIG. 4). The duct piece 900 includes a duct body 902 with a channel 904 extending from a duct inlet 906 to a duct outlet 908. The channel 904 may provide a fluid path for dispensable material (e.g., dispensable material) to flow from the duct inlet 906 to the duct outlet 908 during a dispensing process.

As the dispensable material flows through the channel 904, the dispensable material may contact various apparatus of the one or more sensors 910 disposed in the duct piece 900 to allow the one or more sensors 910 to sense a process parameter of the dispensable material. For example, the one or more sensors may include a probe 912 arranged in the fluid path defined by the channel 904. The probe 912 may be configured to react to a temperature of the dispensable material in a manner that can be detected by the one or more sensors 910. For example, the probe 912 may comprise a thermistor and the one or more sensors 910 may be configured to determine a resistance of the thermistor and sense or determine a temperature of the dispensable material based on the resistance of the thermistor. In one embodiment, the probe 912 may be configured to directly contact the dispensable material in the fluid path. In another embodiment, a shield may separate an outer surface of the probe 912 from the dispensable material and the probe may be configured to sense the temperature of the dispensable material through the shield. The shield may include any suitable material or materials such as, for example, plastic, metal, or other thermally conductive materials.

Further, for example, the one or more sensors 910 may include electrodes 914 arranged in the fluid path defined by the channel 904. The one or more sensors 910 may be configured to provide a voltage across the electrodes 914 and measure a resulting current between the electrodes and through the dispensable material. Based on the measured current, the one or more sensors 910 can sense a conductivity of the dispensable material.

The sensors 438, may include additional sensors and sensor apparatus such as described in PCT Pub. No. 2022/013786 A1 (Minstermann et al.), the disclosure of which is incorporated herein by reference.

Component Library

Systems, apparatus, and methods can generate a predictive model under the assumption that the dispenser is a "black box," or simply a component having inputs and outputs without understanding of internal components of the dispenser. However, other predictive models can be made of the mixing nozzles, dispensing tips, or other components of the adhesive dispenser 100 (FIG. 1), including for example tubes, cartridges, pressure valves, pumps, adapters, pinch tubes, etc. Predictive models can include equations similar to Equation (1) in some embodiments. In some embodiments, similar or different constants can be solved-for using machine learning algorithms. By creating predictive models of dispenser components, when a new dispenser is added to an operator's process, calibration needs can be reduced or eliminated by using settings based on component models previously generated or stored using any of the above processes. Further, new dispenser components can be added to a dispenser without the need for calibration of settings. For example, new dispensing tips can be added, and pressures as already generated and predicted can be applied with these dispensing tips, depending on factors such as viscosity, temperature, etc. as described earlier herein.

Example Methods

Figure 6:
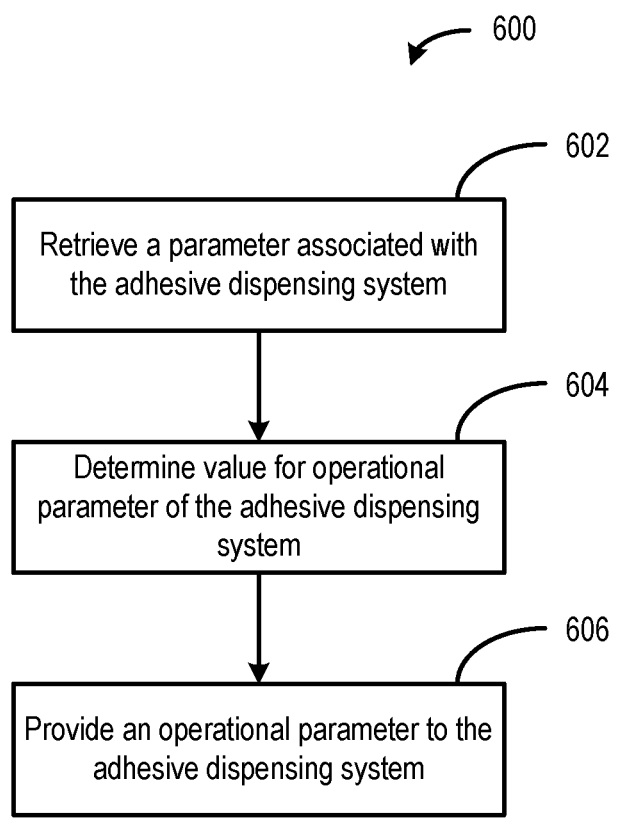
FIG. 6 is a flow chart of a method for predicting an adhesive dispenser pressure in accordance with some embodiments.

FIG. 6 is a flow chart of a method 600 for predicting an adhesive dispenser pressure in accordance with some embodiments. Operations of method 600 can be performed by, for example, processor 704 (FIG. 8) on which algorithms 412 (FIG. 4) can be executed. In examples, algorithms 412 can be partially or completely executed using machine learning and based on inputs automatically generated and provided by sensors, or input by users, among other inputs.

The method 600 can begin with operation 602 with the processor 704 retrieving at least one parameter associated with an adhesive dispenser 100 (FIG. 1). In some embodiments, the at least one parameter relates to viscosity of an adhesive in the adhesive dispenser 100. In some embodiments, operation 602 can include receiving at least one feedback parameter, the at least one feedback parameter indicating quality of an adhesive process. The feedback parameter can be received from a user input or a sensor. In some examples, the feedback parameter can include or be based on image data, or on mass data. Mass data can indicate quantity of adhesive dispensed. In example embodiments, mass feedback data can be used for determining whether quantity of adhesive dispensed is within a target range of a desired quantity of adhesive.

In example embodiments, predictions and suggestions are provided on a user interface, and further the processor 704 can request user input or capture of a calibration point. As described earlier herein, a calibration point can include information similar to that shown in FIG. 5B. This request can be based on a determination that a requested flow rate falls outside a threshold range of a usual range, for example. In other examples, the request can be responsive to determining that environmental parameters fall outside a typical range or a threshold range of a typical range. For example, if room temperature is −20 degrees Fahrenheit, the processor 704 can request the user to manually enter adhesive viscosity at that temperature. In at least these examples, the predictive ability of a machine learning model may be limited due to the unusualness of the environmental factors, and accordingly manual data input is requested.

The suggestions or requests for data capture can be provided on a GUI as described above with reference to FIGS. 5A and 5B.

The machine learning model described above can also predict when current environmental conditions (such as temperature and humidity, although embodiments are not limited thereto) would result in a lower-quality prediction. The GUI 500 can then be used to request or suggest that further calibration points be captured by the user, and to retrieve such calibration points from user input. This can improve the overall machine learning model.

In other example embodiments, if a user requests a flow rate far outside previously requested flow rates, such that application pressure would be much higher than previously used, the user can be notified, either through GUI 500 or audio alarms, etc., that further calibration points should be captured. For example, if the user requests a flow rate that would require a pressure of 50 psi, but a usual dispensing range is 20-40 psi. the user will be requested to provide calibration points related to 50 psi using, for example, an interface similar to that shown in FIG. 5B.

The models described earlier herein can identify opportunities to strengthen the predictive quality. In at least some example embodiments, suggestions can be generated regarding such opportunities, and displayed on the GUI 500 or other user interface. If an opportunity for prediction improvement is identified, systems and apparatus according to embodiments can indicate to the user, whether through audio or visual alarms or indications, text, voice messages, etc., that the user should capture adhesive data that can lead to prediction improvement.

For example, if the machine learning model determines that flow rate data has not been captured at a particular temperature, a system in accordance with embodiments can request that the user capture dispensing data at that particular temperature. Alternatively, systems in accordance with embodiments can control sensors to capture such data at that temperature. In these and other embodiments, further GUI screens can be provided which a user can interact with to manually enter data related to data points that can enhance machine learning algorithms. In at least these embodiments, some or all data can be automatically entered by dispenser components 406 (FIG. 4) either through wireless communications, near field communications (NFC) or other methods. For example, users can manually enter calibration data in a GUI screen 510 as illustrated in FIG. 5B.

FIG. 5B illustrates an example GUI for manual entry of calibration data in accordance with some embodiments. In the example, a user can enter a lot number 512 identifying a manufacturing lot of liquid adhesive. In other examples, lot number 512 can be provided automatically, for example, by reading of an RFID chip associated with the dispenser components 406, or by wireless communication from the dispenser components 406. The pressure used can be provided at 514. Mass dispensed can be provided by the dispenser components 406, for example by sensors 438, for automatic or manual entry into field 516. Sensors 438 can also provide feedback data for algorithms 412, including machine learning algorithms. The amount of time to dispense 518 can be entered manually the user, or controllers 432 can provide such time values, for example. Other parameters that impact pressure prediction can be included or entered, for example temperature 520. Users can delete related data points or add data points using interface buttons 522 and 524, respectively.

The method 600 can continue with operation 604 with the processor 704 determining a value for an operational parameter of the adhesive dispenser 100. The value can be based on the at least one parameter that was received in operation 602. The value for the operational parameter can be such that a desired flow rate will be achieved in the adhesive dispensing system.

The method 600 can continue with operation 606 with the processor 704 providing the operational parameter to the adhesive dispenser 100. In embodiments, the operational parameter can be a driving force pressure for the adhesive dispensing system. In embodiments, driving force pressure is determined based on the viscosity and on parameters specific to the adhesive dispenser 100. For example, determining driving force pressure can be according to Equation (1) described earlier herein: $m = G(F1(p), F2(\mu) \ldots )$, where m is mass dispensed by the adhesive dispensing system, F1 is a function of pressure p, and F2 is a function of viscosity $\mu$.

Viscosity p can be determined based on direct or indirect measurement, polynomial fit, numerical regression, or an equation such as Andrade's equation for viscosity of liquids, provided in Equation (2).

As described earlier herein, the constants related to Equations (1) and (2) can be determined using a machine learning algorithm. The machine learning algorithm can minimize a loss function associated with at least one of driving force pressure, mass, viscosity, and temperature. The machine learning algorithm can be based on models other than neural network models (e.g., non-neural network models and machine learning algorithms), or can be based on a hybrid between a neural networking model and other model (e.g., a hybrid algorithm).

As described earlier herein, other systems based purely on neural networks can be used to control instructions for applying adhesives. However, systems based solely on neural networks require hundreds, or even thousands of calibration points to be useful, and there is substantial learning that must take place before any control of adhesive dispensing is possible. Example embodiments described earlier herein can be based on other machine learning models, or non-neural network-based, or a combination of neural networks and other machine learning models.

Figure 7:
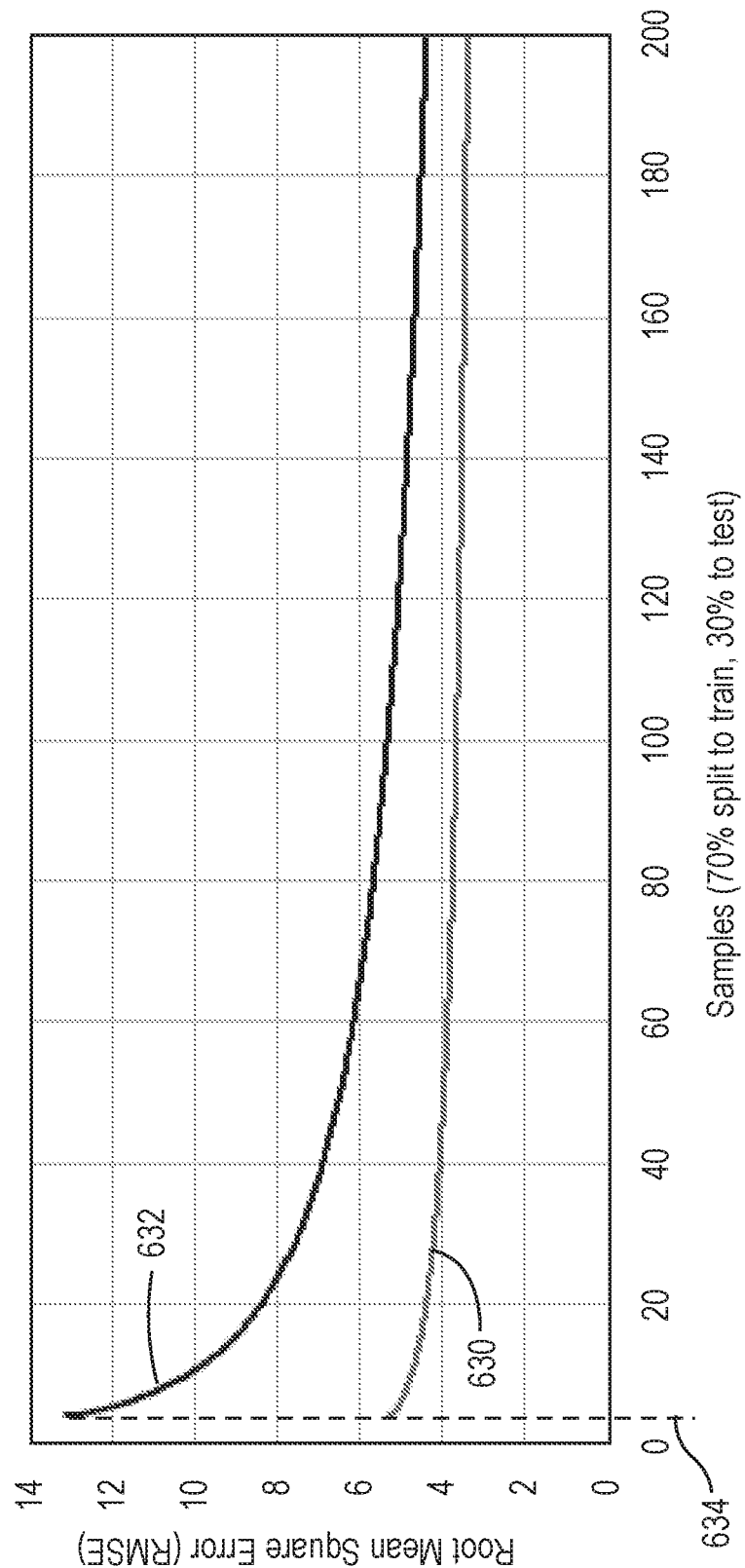
FIG. 7 depicts a comparison between performance of a neural network-based model and a learning model used in some embodiments.

FIG. 7 depicts a comparison between performance for a neural network-based model and a learning model used in some example embodiments. A dataset of laboratory-generated data was used for this comparison. The dataset was sampled for the given number of data points which was then split into two groups with 70% of the data used for training the model and 30% reserved for testing the quality of the model after the model was trained. The split data was passed to each model so that the models were analyzing the same experimental data in every case. The result was that systems using models in accordance with embodiments had lower average root mean square error at every sampling level, as shown at curve 630 (compared to curve 632, which illustrates systems using neural network models) with the difference between curve 630 and 632 especially large at the lower sampling levels 634. As will be appreciated, because average root mean square error is small even at low sample levels using methods according to embodiments, cost savings can be achieved by reducing the need for large numbers of samples (which in turn reduces manufacturing, laboratory, and material costs). The ability to obtain a useful prediction with relatively few data points is a significant advancement over existing neural network methods.

Figure 11:
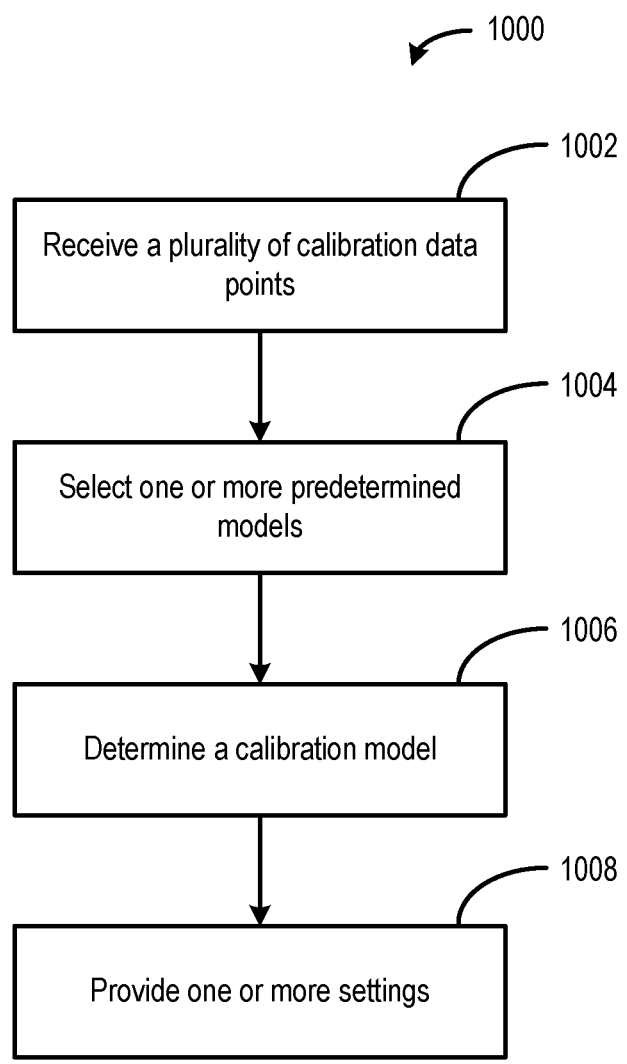
FIG. 11 is a flow chart of a method for calibrating a dispenser system in accordance with some embodiments.

FIG. 11 is a flow chart of a method 1000 for calibrating a dispenser system in accordance with some embodiments. Operations of method 1000 can be performed by, for example, processor 704 (FIG. 8).

Every dispenser system may be different in both subtle and significant ways such that calibration data from one dispenser system cannot be used to calibrate another dispenser system. In order to calibrate (e.g., setup) a dispenser system, the user may load dispensable material (e.g., dispensable material 436) into the dispenser system and configure all the associated parts of the dispenser system including a plunger, an air line, a controller, a static mixer, a pinch tube or valve, a tip, and other components. When ready, the user dispenses dispensable material at different pressures into a cup and weighs the dispensed dispensable material. Each combination of dispensed mass and pressure setting may form a calibration data point. However, various conditions can result in "bad" calibration data points. For example, if there is an air bubble in the system, if material sticks on the tip of the dispenser system, if material from a previous dispenser shot is included in the dispensed mass of another shot, if the pressure or mass is set or recorded incorrectly, or if other sources of error are present, then the data from the calibration may not result in a useful model.

The method 1000 can correct for "bad" calibration data points by requesting a set of calibration data points, assessing the quality of the set of calibration data points, removing "bad" or low-quality calibration data points, and requesting additional calibration data points as needed.

The method 1000 can begin with operation 1002 with the processor 704 receiving a plurality of calibration data points and one or more parameters of dispenser components of the dispenser system. A user may be instructed to set a pressure gauge (e.g., the dispenser pressure) to certain pressures and record the mass that is dispensed. The instructions may also include a dispensing time for each calibration data point. Alternatively, the processor may automatically set the pressure, dispense dispensable material, and record each calibration data point and the associated parameters. Typical calibration methods may require hundreds or thousands of calibration data points. In contrast, the plurality of calibration data points of the method 1000 may include at least 2 calibration data points to no greater than 100 calibration data points or any suitable range therebetween. For example, the plurality of calibration data points may include a number of calibration data points in a range from at least 2 calibration data points, 5 calibration data points, 10 calibration data points, or 15 calibration data points to no greater than 20 calibration data points, 40 calibration data points, 60 calibration data points, 80 calibration data points, or 100 calibration data points. Each of the calibration data points may include any suitable parameters. For example, each of the plurality of calibration data points may include one or more of manufacturing lot information of the dispensable material, a dispenser pressure, a mass dispensed, a time dispensed, an ambient temperature, a temperature of the dispensable material, etc. In one embodiment, each of the plurality of calibration points comprises a dispenser pressure, a dispensing time, and a mass of dispensable material dispensed.

The one or more parameters of the dispenser components may include any suitable parameters. For example, the one or more parameters of the dispenser components may include manufacturing lot information of the dispensable material, a model number of the dispenser components, a type of the dispensable material (e.g., adhesive, sealant, thermal paste, etc.), etc. The one or more parameters may be received from the dispenser components, a database, a user, an image, etc.

The method 1000 can continue with operation 1004 with the processor selecting one or more predetermined models based on the one or more parameters of the dispenser components. In one or more embodiments, the one or more parameters comprises a manufacturing lot of the dispensable material. The one or more predetermined models may be retrieved based on the manufacturing lot of the dispensable material. For example, each manufacturing lot or type of dispensable material may correspond to a given set of predetermined models.

The method 1000 can continue with operation 1006 with the processor determining a calibration model based on the plurality of calibration data points and the one or more predetermined models. For example, the calibration model may include one or more settings corresponding to a predetermined model of the one or more predetermined models that the modified set of calibration data points best corresponds to based on statistical methods and modeling. In some examples, the plurality of calibration data points may fit or match one of the predetermined models and the calibration model can be determined based on the plurality of calibration data points and the one or more predetermined models without modification to the plurality of calibration data points. However, in some examples, the plurality of calibration data points may not fit or match one of the predetermined models due to one or more outliers or an insufficient number of calibration data points. Accordingly, determining the calibration model may include producing a modified set of calibration data points that may have outliers of the plurality of calibration data points removed and/or additional calibration data points added.

Determining the calibration model may include determining one or more outliers of the plurality of calibration data points based on the one or more models. Determining the one or more outliers may include any suitable technique or techniques. For example, determining the one or more outliers may include using one or more statistical models or methods. In one embodiment, determining the one or more outliers may include a regression analysis based on the plurality of calibration points and the one or more predetermined models. Additionally, or alternatively, determining the one or more outliers may include determining one or more calibration points of the plurality of calibration points that differ from a corresponding data point of the one or more predetermined models by more than a threshold value. The threshold value may be a percentage difference. In other words, a difference between the mass dispensed of an outlier calibration data point and a mass dispensed for a data point corresponding to the same dispenser pressure and time in one of the predetermined models may have a difference that exceeds a predetermined percentage of the mass dispensed for the data point of the predetermined model. The threshold value may be determined based on the predetermined model.

Determining the calibration model may further include removing the one or more outliers from the plurality of calibration data points to produce a modified set of calibration data points. The method 1000 may optionally include an operation with the processer determining the modified set of calibration data points includes less than a threshold number of data points. If the modified set of calibration data points includes less than the threshold number of data points the modified set of calibration data points may not be sufficient to determine whether the calibration data points fit a particular one of the one or more predetermined models.

Accordingly, the method 1000 may also include an operation with the processor determining one or more dispenser pressures for one or more additional calibration data points based on the modified set of calibration data points and the one or more predetermined models. The one or more additional calibration data points may include a dispenser pressure between the dispenser pressure of two missing or removed data points. Additionally, or alternatively, the one or more additional calibration data points may include the same dispenser pressures as the one or more outliers.

The method 1000 may also include an operation with the processor requesting the one or more additional calibration data points using a display. Each of the one or more additional calibration data points may correspond to one of the one or more dispenser pressures. The method 1000 may also include an operation with the processor receiving the one or more additional calibration data points using a user interface and modifying the modified set of calibration data points to include the one or more additional calibration data points.

Accordingly, determining a calibration model may be based on the modified set of calibration data points and the one or more predetermined models. For example, the calibration model may be determined after one or more outliers have been removed or after one or more additional calibration data points have been added to the set of modified data points.

The method 1000 can continue with operation 1008 with the processor providing one or more settings for the dispenser system based on the calibration model. In embodiments, providing the one or more settings may include adjusting one or more settings of the dispenser components of the dispenser system. In other words, the processor may adjust various settings of the dispenser system. Additionally, or alternatively, the processor may present various calibration settings to the user using a display such as GUI 500.

Figure 12:
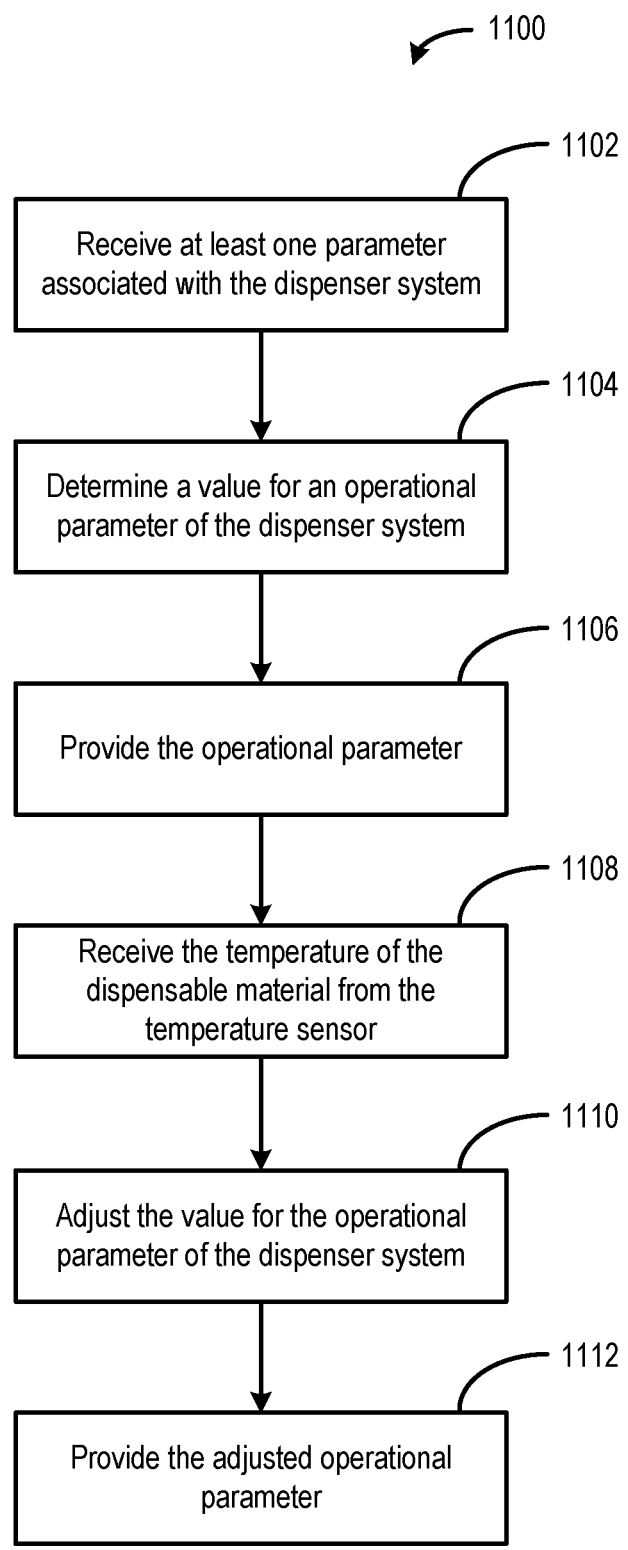
FIG. 12 is a flow chart for dispensing a dispensable material in accordance with some embodiments.

FIG. 12 is a flow chart of a method 1100 for dispensing a dispensable material (e.g., dispensable material 436) in accordance with some embodiments. Operations of method 1100 can be performed by, for example, processor 704 (FIG. 8).

The method 1100 can begin with operation 1102 with the processor 704 receiving at least one parameter associated with a dispensable material dispenser 100 (FIG. 1). The at least one parameter may be received from the dispenser components, a database, a user, an image, etc. In some embodiments, the at least one parameter relates to viscosity of the dispensable material in the dispensable material dispenser 100. In some embodiments, the at least one parameter may relate to a density of the dispensable material in the dispensable material dispenser 100. In some embodiments, operation 1102 can include receiving at least one feedback parameter of the dispensable material. The process parameter can be received from a user input or a sensor. In some examples, the feedback parameter can include or be based on image data, or on mass data. Mass data can indicate quantity of dispensable material dispensed. For example, the mass data and the density of the dispensable material may be used to determine a volume of dispensable material dispensed. Accordingly, a volumetric flow rate of the dispensable material can be determined and/or monitored based on the mass data and the density of the dispensable material. In example embodiments, mass feedback data can be used for determining whether quantity of dispensable material dispensed is within a target range of a desired quantity of dispensable material.

The method 1100 can continue with operation 1104 with the processor 704 determining a value for an operational parameter of the dispensable material dispenser 100. The value can be based on the at least one parameter that was received in operation 1102. The value for the operational parameter can be such that a desired flow rate will be achieved in the dispensable material dispensing system.

The method 1100 can continue with operation 1106 with the processor 704 providing the operational parameter. In embodiments, the operational parameter may be provided to the dispensable material dispenser 100. In other embodiments, the operational parameter may be provided to the human machine interface 404. In embodiments, the operational parameter can be a driving force pressure for the dispensable material dispensing system. In embodiments, driving force pressure is determined based on the viscosity and on parameters specific to the dispensable material dispenser 100 as described earlier herein.

The method 1100 can continue with operation 1108 with the processor receiving at least one process parameter including a temperature of the dispensable material. The at least one process parameter may also include, for example, conductivity, viscosity, weight, mass, or other parameter of the dispensable material (e.g., adhesives, sealants, thermal pastes, etc.). The at least one process parameter may be received from one or more sensors. For example, the temperature of the dispensable material may be received from the temperature sensor 910 of FIG. 10. The probe 912 of the temperature sensor 910 may be disposed or arranged in the fluid path of the dispensable material allowing the temperature sensor 910 to sense or measure a temperature of the dispensable material.

The method 1100 can continue with operation 1110 with the processor adjusting the value for the operational parameter of the dispensable material dispensing system based on the temperature of the dispensable material. As the temperature of the dispensable material changes, the viscosity of the dispensable material may change. Accordingly, adjusting the value of the operational parameter (e.g., driving force pressure) a more consistent rate of flow of the dispensable material can be achieved. Additional process parameters may impact viscosity and flow rate of the dispensable material. Such process parameters may be sensed using sensors 910 or any other suitable sensor or apparatus. For example, the sensor 910 may further include a conductivity sensor to sense a conductivity of the dispensable material. The method 1100 may further include the processor receiving a sensed conductivity of the dispensable material from the conductivity sensor. Still further, the method 1100 may include determining a state of cure of the dispensable material based on the sensed temperature of the dispensable material and the sensed conductivity of the dispensable material and adjusting the value for the operational parameter of the dispensable material dispensing system based on the sensed temperature and the state of cure.

Once the dispensable material has been mixed during a dispensing process, the dispensable material may begin to cure before the dispensable material has been dispensed. As the dispensable material cures, the viscosity of the dispensable material may change. In addition to temperature and conductivity, the state of cure can also be determined based on the time after initial mixing (e.g., residence time in a static mixer and beyond). With a known state of cure, the viscosity of the dispensable material can be predicted and the impact on flow rate can be calculated. This information can be used to adjust the operational parameter (e.g., the driving force pressure) to maintain a more constant flow rate of the dispensable material 436. Additionally, the method 1100 may include initiating a purge if the viscosity of the dispensable material exceeds a threshold viscosity level. The threshold viscosity level may be set or determined based on operational limits of the dispensable material dispensing system, parameters set by a user, or parameters of a current dispensing job or process.

The method 1100 can continue with operation 1112 with the processor providing the operational parameter. In embodiments, the processor may provide the operational parameter to the one or more dispenser components. In other embodiments, the processor may provide the operational parameter to the human interface device. Accordingly, the flow rate of the dispensable material can be maintained by continuously or periodically adjusting the operational parameter and providing the adjusted operational parameter to the one or more dispenser components. For example, the driving force pressure can be adjusted continuously to account for curing, temperature, and/or viscosity changes of the dispensable material. Furthermore, the adjusted operational parameter can be provided to the one or more dispenser components any time the operational parameter is adjusted. The adjusted operational parameter can be provided using wired or wireless communications described herein. Additionally, the processor may initiate a purge by communicating with a motion controller configured to move or direct the dispenser to a purge receptacle.

The method 1100 can also include operations for determining the parameters of a purge of the dispensable material. The method 1100 can include an operation with the processor determining a maximum idle time or a purge time for the one or more dispenser components based on the at least one parameter and the at least one process parameter. The method 1100 can also include an operation with the processor providing the maximum idle time or the purge time. In embodiments, the maximum idle time or the purge time may be provided to one or more dispenser components. Accordingly, the dispenser components can initiate an automatic purge based on the maximum idle time and/or the purge time. In embodiments, the maximum idle time or the purge time may be provided to the human machine interface. Accordingly, the maximum idle time or the purge time may be displayed to a user.

Many factors can influence the work life of two-part dispensable materials. Such factors may include, for example, temperature, age of the material, density, initial manufacturing viscosity, and other potential factors. Such factors may contribute to modifying the cure rate kinetics and, in turn, change the amount of time the dispensable material can sit in the dispenser before purging may be needed. An additional factor that can contribute to a maximum idle time is the rate of dispensing. The time period that dispenser components are determined to be idle may start after the last dispense of dispensable material. If the active period (e.g., dispensing) includes high flow rate dispensing shots with little time in between, the dispensable material may be relatively fresh when dispensing ceases. However, if the flow rate is low and/or the dispensing shots are spaced apart by longer periods of time, then the dispensable material may be partially cured when dispensing ceases. Accordingly, the maximum idle time and/or purge time should be different for each of these cases. By determining a maximum idle time and/or a purge time based on the at least one parameter and the at least one process parameter, the maximum idle time and/or purge time can be tailored to the temperature of the dispensable material, age of the dispensable material, density of the dispensable material, viscosity of the dispensable material, rate of dispensing, flow rate, time in between dispensing shots etc.

Additionally, the method 1100 can account for safety factors and process control factors in determining the maximum idle time and purge time. The method 1100 can also include an operation with the processor receiving one or more user inputs that include a safety factor, a process control factor, and a waste factor and determining the maximum idle time or the purge time based on the one or more user inputs, the at least one parameter, and the at least one process parameter. The user inputs may be received using a user interface (e.g., GUI 500). In one example, the user may select or provide a safety factor so that if there is variability in the dispensing process, the dispensable material does not cure prematurely. In other words, the maximum idle time may be determined based on a cure time of the dispensable material when a safety factor is provided. In another example, the user may want tight control over the flow rate at the expense of dispensable material waste. In other words, the maximum idle time may be determined based on flow rate variability that may occur before the dispensable material is cured when control factors are provided. In yet another example, the user may select a waste factor indicating low amount of waste so that as little dispensable material is wasted as possible. When multiple factors are entered, the particular values of the factors may be balanced against one another to determine the maximum idle time and the purge time.

A display may also allow the user to see how the safety factor, process control factor, and waste factor affect the maximum idle times and purge times and vice versa. In some embodiments, the user can set the safety factor, process control factors, and waste factor as parameter values. The parameter values received from the user can be incorporated into algorithm(s) used to determine maximum idle times and purge times.

Computer Apparatus

Systems, methods, and apparatus can implement embodiments using processors, in firmware or software, remotely or locally to the operator processes, or in the cloud or edge computing device, as will be described in more detail later herein. Machine learning can be distributed among several different devices and implemented completely or partially within the adhesive dispensing device itself. For example, some identification processes can be performed by the adhesive dispenser 100 (FIG. 1), and inputs therefrom can be provided to local or remote devices to formulate predictions regarding dispenser settings. Accordingly, the apparatus and circuitry of the adhesive dispenser 100, data components 402, human machine interface 404 and dispenser components 406 (FIG. 4), and other components, can be executed or partially executed on computing systems, for example edge computing nodes. FIG. 8 depicts an edge computing node in accordance with some embodiments.

Figure 8:
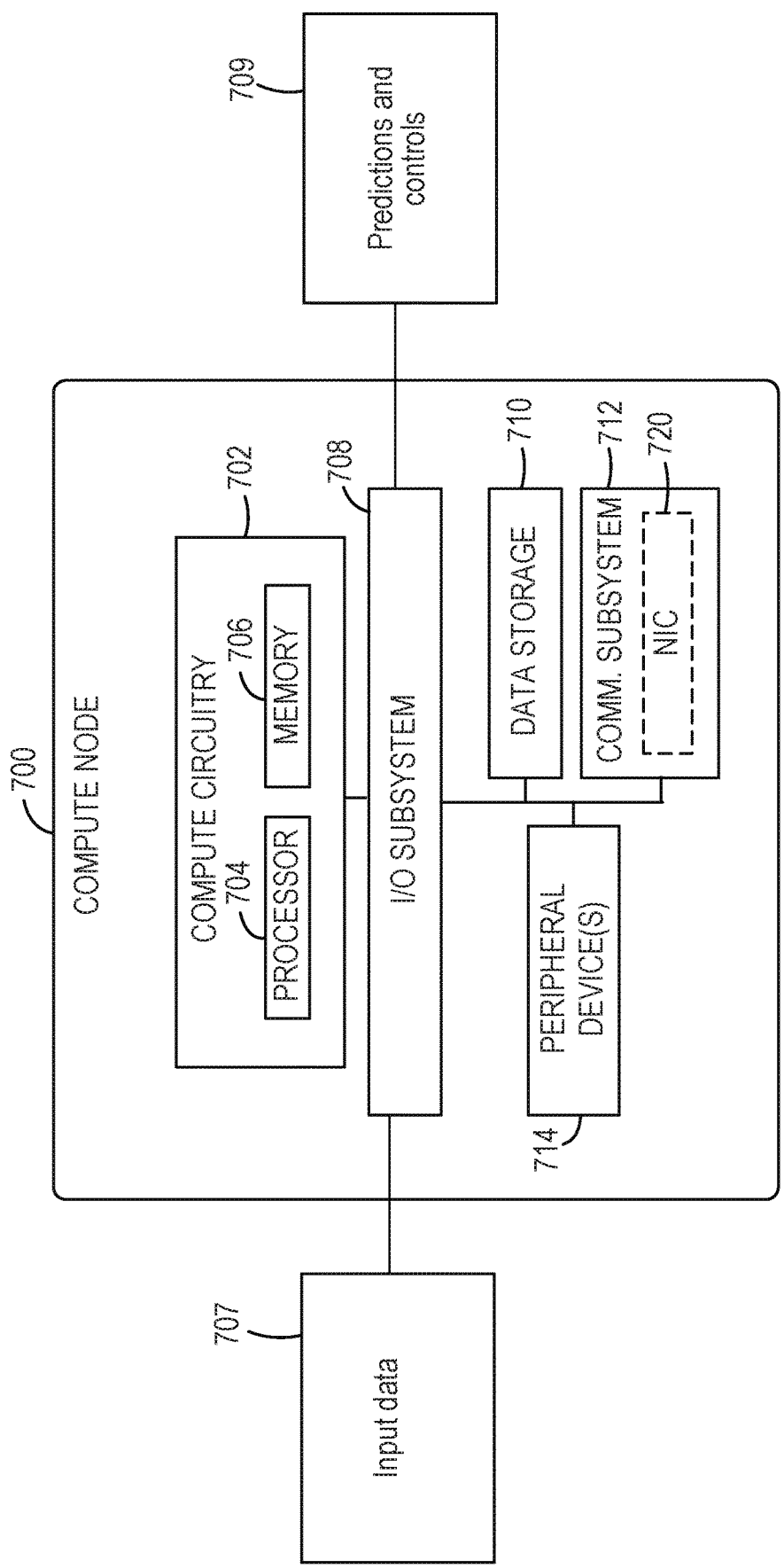
FIG. 8 depicts a computing node in accordance with some embodiments.

In the simplified example depicted in FIG. 8, an edge compute node 700 (e.g., apparatus) includes a compute engine (also referred to herein as "compute circuitry") 702, an input/output (I/O) subsystem 708, data storage device 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, or other processor or processing/controlling circuit. In some examples, the processor 704 may be embodied as, include, or be coupled to an FPGA, an application specific integrated circuit (ASIC), reconfigurable hardware or hardware circuitry, or other specialized hardware to facilitate performance of the functions described herein.

The memory 706 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random-access memory (RAM), such as DRAM or static random-access memory (SRAM). One particular type of DRAM that may be used in a memory module is synchronous dynamic random-access memory (SDRAM).

In an example, the memory device is a block addressable memory device, such as those based on NAND or NOR technologies. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry or components to facilitate input/output operations with the compute circuitry 702 (e.g., with the processor 704 or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702. The I/O subsystem 708 can receive input data 707 from other components of FIG. 4, for example, sensors 428, sensors 438, etc. and provide predictions and controls 709 to other components of FIG. 4, for example, dispenser components 406.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN), ultra-wide-band or low-power wide-area (LPWA) protocols, etc.) to effect such communication.

The illustrative communication circuitry 712 includes a network interface controller (NIC) 720. The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors or included on a multichip package that also contains one or more processors. In some examples, the NIC 720 may include a local processor (not shown) or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 9:
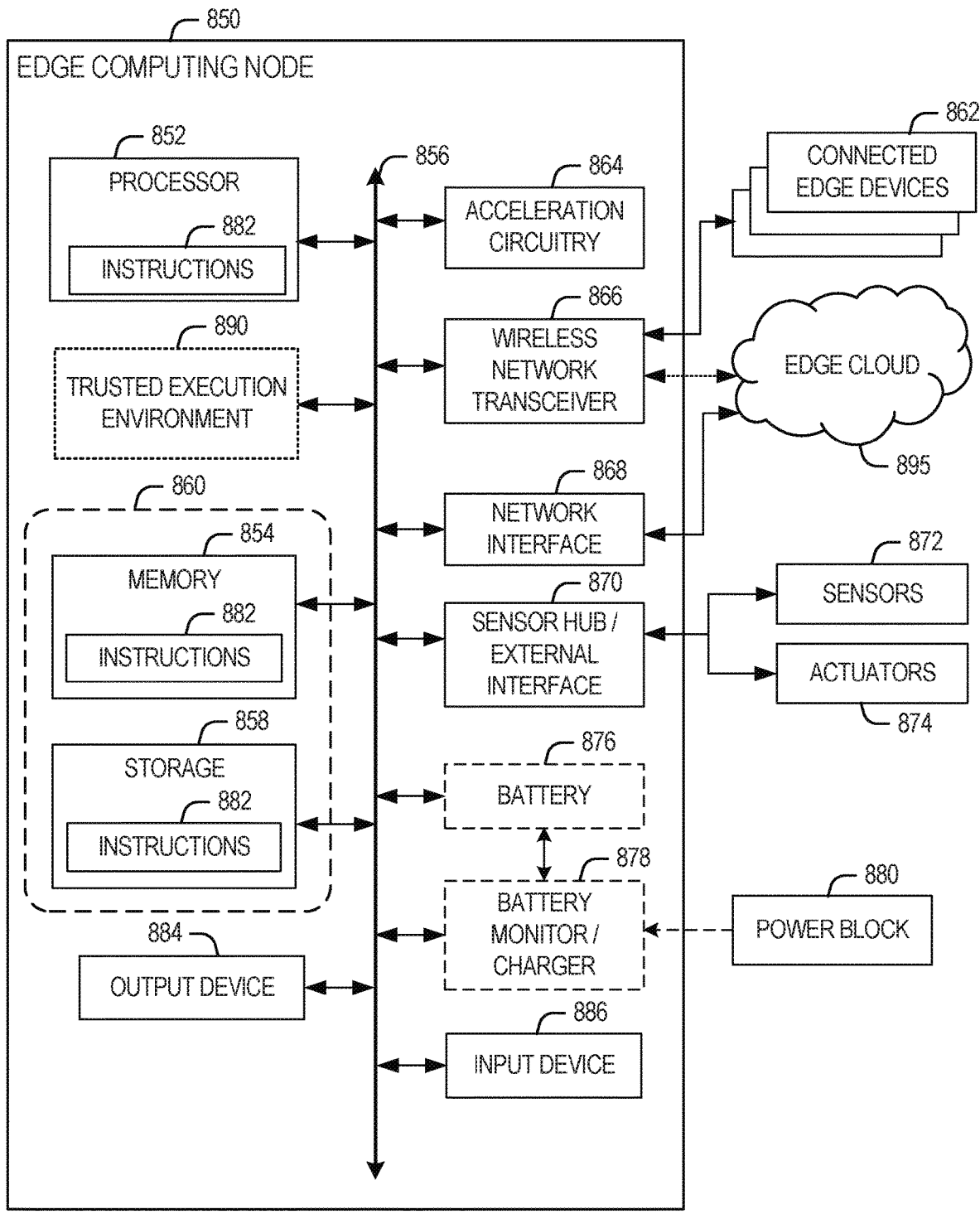
FIG. 9 depicts further details on edge computing node in accordance with some embodiments.

In a more detailed example, FIG. 9 illustrates a block diagram of an example of components that may be present in an edge computing node 850 for implementing the techniques (e.g., operations, processes, methods, and methodologies) described herein. This edge computing node 850 provides a closer view of the respective components of node 700 when implemented as or as part of a computing device (e.g., as a computer, a mobile device, a server, a smart sensor, a control system, etc.). The edge computing node 850 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 850, or as components otherwise incorporated within a chassis of a larger system.

The edge computing node 850 may include processing circuitry in the form of a processor 852, which may be a microprocessor, a multi-core processor, a multithreaded processor, an ultra-low voltage processor, an embedded processor, or other known processing elements. The processor 852 may be a part of a system on a chip (SoC) in which the processor 852 and other components are formed into a single integrated circuit, or a single package. The processor 852 and accompanying circuitry may be provided in a single socket form factor, multiple socket form factor, or a variety of other formats, including in limited hardware configurations or configurations that include fewer than all elements shown in FIG. 9.

The processor 852 may communicate with a system memory 854 over an interconnect 856 (e.g., a bus). Any number of memory devices may be used to provide for a given amount of system memory. As examples, the memory 854 may be random access memory (RAM) in accordance with a Joint Electron Devices Engineering Council (JEDEC) design. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example, the storage 858 may be implemented via a solid-state disk drive (SSDD). Other devices that may be used for the storage 858 include flash memory cards, such as Secure Digital (SD) cards, microSD cards, eXtreme Digital (XD) picture cards, and the like, and Universal Serial Bus (USB) flash drives.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC based system. Other bus systems may be included, such as an Inter-Integrated Circuit (I2C) interface, a Serial Peripheral Interface (SPI) interface, point to point interfaces, proprietary busses, and a power bus, among others.

The interconnect 856 may couple the processor 852 to a transceiver 866, for communications with the connected edge devices 862. The connected edge devices 862 can include other elements or portions of other elements depicted in FIG. 9, or other elements of manufacturing systems in use by the operator, either remotely or locally to tape automation systems. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the edge computing node 850 may communicate with close devices, e.g., within about 10 meters, using a local transceiver based on Bluetooth Low Energy (BLE), or another low power radio, to save power. More distant connected edge devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in the edge cloud 895 via local or wide area network protocols. The wireless network transceiver 866 may be a low-power wide-area (LPWA) transceiver that follows the IEEE 802.15.4, or IEEE 802.15.4g standards, among others. The edge computing node 850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 866 may include radios that are compatible with any number of 3GPP (Third Generation Partnership Project) specifications, such as Long Term Evolution (LTE) and 5th Generation (5G) communication systems. A network interface controller (NIC) 768 may be included to provide a wired communication to nodes of the edge cloud 895 or to other devices, such as the connected edge devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network. Ultra-wideband sensors and emitters may be used to facilitate precise positioning of tape relative to defined emitter beacons, as well as communications such as data transfer.

Given the variety of types of applicable communications from the device to another component or network, applicable communications circuitry used by the device may include or be embodied by any one or more of components 864, 866, 868 or 870. Accordingly, in various examples, applicable means for communicating (e.g., receiving, transmitting, etc.) may be embodied by such communications circuitry.

The edge computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of data processing units (DPUs) or Infrastructure Processing Units (IPUs), one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors or gauges, global navigation system (e.g., GPS) sensors, pressure sensors, barometric pressure sensors, any sensors for detecting conditions of tapes or other adhesives, primers, substrates, and the like. These sensors may be directly connected to the computing device or remotely located as part of various manufacturing modules. The hub or interface 870 further may be used to connect the edge computing node 850 to actuators 874, such as power switches, valve actuators, an audible sound generator, a visual warning device, and the like. These actuators may be directly connected to the computing device or remotely located as part of various manufacturing modules.

In some optional examples, various input/output (I/O) devices may be present within or connected to, the edge computing node 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 850. A display or console hardware, in the context of the present system, may be used to provide output and receive input of an edge computing system; to manage components or services of an edge computing system; identify a state of an edge computing component or service; or to conduct any other number of management or administration functions or service use cases. These various input/output devices may be directly connected to the computing device or remotely located as part of various manufacturing modules. In examples, notifications can be provided to more than one device simultaneously, for example, a user can view notifications on individual modules of the system 400. Simultaneously or near simultaneously, based proximity or other criteria, notifications can be provided to the user's smartphone or other device such as a tablet or computer, or to a stand-alone device or a device separate from user's personal equipment.

A battery 876 may power the edge computing node 850, although, in examples in which the edge computing node 850 is mounted in a fixed location, it may have a power supply coupled to an electrical grid, or the battery may be used as a backup or for temporary capabilities. The battery 876 may be a lithium-ion battery, or a metal-air battery, such as a zinc-air battery, an aluminum-air battery, a lithium-air battery, and the like.

A battery monitor/charger 878 may be included in the edge computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may communicate the information on the battery 876 to the processor 852 over the interconnect 856. The battery monitor/charger 878 may also include an analog-to-digital (ADC) converter that enables the processor 852 to directly monitor the voltage of the battery 876 or the current flow from the battery 876.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the edge computing node 850. The specific charging circuits may be selected based on the size of the battery 876, and thus, the current required.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine-readable medium 860 including code to direct the processor 852 to perform electronic operations in the edge computing node 850. The processor 852 may access the non-transitory, machine-readable medium 860 over the interconnect 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also, in a specific example, the instructions 882 on the processor 852 (separately, or in combination with the instructions 882 of the machine readable medium 860) may configure execution or operation of a trusted execution environment (TEE) 890. In an example, the TEE 890 operates as a protected area accessible to the processor 852 for secure execution of instructions and secure access to data.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Herein, the term "comprises," and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other claims are not useful and is not intended to exclude other embodiments from the scope of the disclosure.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.) and any sub-ranges (e.g., 1 to 5 includes 1 to 4, 1 to 3, 2 to 4, etc.).

As used herein, the term "room temperature" refers to a temperature of 20° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the features, configurations, compositions, or characteristics may be combined in any suitable manner in one or more embodiments.

EXAMPLES

These examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed considering the number of reported significant digits and by applying ordinary rounding.

Unless otherwise noted, all chemicals used in the examples can be obtained from the noted suppliers. Adhesives used in example embodiments can include the adhesives described below.

Adhesives

Generally, structural adhesives may be divided into two broad categories: one-part adhesives and two-part adhesives. With a one-part adhesive, a single composition comprises all the materials necessary to obtain a final cured adhesive. Such adhesives are typically applied to the substrates to be bonded and exposed to elevated temperatures (e.g., temperatures greater than 500° C.) to cure the adhesive. In contrast, two-part adhesives comprise two components. The first component, typically referred to as the "base resin component," comprises the curable resin. The second component, typically referred to as the "accelerator component," comprises the curing agent(s) and catalysts. Various other additives may be included in one or both components.

Other adhesives used herein can include hot melt adhesives, for example one-component, moisture-curing hot melt adhesives. This product group is characterized by a very high heat resistance compared to classic, thermoplastic PO hot melts. In some examples, polyurethane (PUR) hot melts that contain isocyanates for the chemical crosslinking process are used. In other examples, polyolefin (POR) hot melts that use silanes as the reactive component are used herein. Two component adhesives are 100% solids systems that obtain their storage stability by separating the reactive components. They are supplied as "resin" and "hardener" in separate containers. It is important to maintain the prescribed ratio of the resin and hardener to obtain the desired cure and physical properties of the adhesive. The two components are only mixed together to form the adhesive a short time before application with cure occurring at room temperature. Since the reaction typically begins immediately upon mixing the two components, the viscosity of the mixed adhesive increases with time until the adhesive can no longer be applied to the substrate or bond strength is decreased due to diminished wetting of the substrate. Formulations are available with a variety of cure speeds providing various working times (worklife) after mixing and rates of strength build-up after bonding. Final strength is reached in minutes to weeks after bonding depending on the formulation. Adhesive must be cleaned from mixing and application equipment before cure has progressed to the point where the adhesive is no longer soluble. Depending on work life, two component adhesives can be applied by trowel, bead or ribbon, spray, or roller. Assemblies are usually fixtured until sufficient strength is obtained to allow further processing. If faster rate of cure (strength build-up) is desired, heat can be used to accelerate the cure. This is particularly useful when parts need to be processed more quickly after bonding or additional work life is needed but a slower rate of strength build-up cannot be accommodated. When cured, two component adhesives are typically tough and rigid with good temperature and chemical resistance.

Two component adhesives can be mixed and applied by hand for small applications. However, this requires considerable care to ensure proper ratio of the components and sufficient mixing to insure proper cure and performance. There is usually considerable waste involved in hand mixing as well. As a result, adhesive suppliers have developed packaging that allows the components to remain separate for storage and provides a means for dispensing mixed adhesive, e.g., side-by-side syringes, concentric cartridges. The package is typically inserted into an applicator handle and the adhesive is dispensed through a disposable mixing nozzle. The proper ratio of components is maintained by virtue of the design of the package and proper mixing is insured by use of the mixing nozzle. Adhesive can be dispensed from these packages multiple times provided the time between uses does not exceed the worklife of the adhesive. If the work life is exceeded, a new mixing nozzle must be used. For larger applications, meter-mix equipment is available to meter, mix, and dispense adhesive packaged in containers ranging from quarts to drums.

Two-part adhesives consist of a resin and a hardener component which cure once the two components are mixed together. They remain stable in storage as long as the two components are separate from each other. Two-part adhesives are typically designed to be dispensed in a set ratio to gain the desired properties from the specifically formulated adhesive; common ratios include, 10:1, 1:1, 2:1 and so on. The reaction between the two components normally begins immediately once they are mixed and the viscosity increases until they are no longer usable. This can be described as work life, open time, and pot life, as discussed above. Once cured, two component adhesives are tough and rigid with good temperature and chemical resistance.

Epoxy Adhesives

As described earlier herein, epoxy adhesives of example embodiments can include one-part and two-part adhesives. One-part epoxy adhesives can include a resin. Like their one-part cousins, two-part epoxies are also formulated from epoxy resins. Two-part epoxies are widely used in structural applications and are used to bond many materials including, for example: metal, plastic, fiber reinforced plastics (FRP), glass and some rubbers. They are generally fast to cure and provide a relatively rigid bond. Some compositions can often be brittle although toughening agents and elastomers can be utilized to reduce this tendency.

Two-part structural epoxy adhesives are made up of a Resin (Part A or Part 1) and Hardener (Part B or Part 2). An accelerator or chemical catalyst can speed up the reaction between the resin and hardener.

A two-part epoxy can cure at room temperature, so heat is not necessarily required when using one. Two-part epoxies generally achieve handling strength anywhere between five minutes and eight hours after mixing, depending on the curing agents. A chemical catalyst or heat can be applied to speed the reaction between the resin and hardener.

The resin that is the basis for all epoxy is the diglycidyl ether of bisphenol A (DGEBA). Bisphenol A is produced by reacting phenol with acetone under suitable conditions. The "A" stands for acetone, "phenyl" means phenol groups and "bis" means two. Thus, bisphenol A is the product made from chemically combining two phenols with one acetone. Unreacted acetone and phenol are stripped from the bisphenol A, which is then reacted with a material called epichlorohydrin. This reaction sticks the two ("di") glycidyl groups on ends of the bisphenol A molecule. The resultant product is the diglycidyl ether of bisphenol A, or the basic epoxy resin. It is these glycidyl groups that react with the amine hydrogen atoms on hardeners to produce the cured epoxy resin. Unmodified liquid epoxy resin is very viscous and unsuitable for most uses except as a very thick glue.

Chemical raw materials used to manufacture curing agents, or hardeners, for room-temperature cured epoxy resins are most commonly polyamines. They are organic molecules containing two or more amine groups. Amine groups are not unlike ammonia in structure except that they are attached to organic molecules. Like ammonia, amines are strongly alkaline. Because of this similarity, epoxy resin hardeners often have an ammonia-like odor, most notable in the air space in containers right after they are opened. Epoxy hardeners are commonly referred to as "Part B".

Reactive amine groups are nitrogen atoms with one or two hydrogen atoms attached to the nitrogen. These hydrogen atoms react with oxygen atoms from glycidyl groups on the epoxy to form the cured resin—a highly crosslinked thermoset plastic. Heat will soften, but not melt, a cured epoxy. The three-dimensional structure gives the cured resin excellent physical properties.

The ratio of the glycidyl oxygens to the amine hydrogens, taking into account the various molecular weights and densities involved, determines the final resin to hardener ratio. The proper ratio produces a "fully-crosslinked" thermoset plastic. Varying the recommended ratio will leave either unreacted oxygen or hydrogen atoms depending upon which is in excess. The resultant cured resin will have lower strength, as it is not as completely crosslinked. Excess Part B results in an increase in moisture sensitivity in the cured epoxy and generally should be avoided.

Amine hardeners are not "catalysts". Catalysts promote reactions but do not chemically become a part of the finished product. Amine hardeners mate with the epoxy resin, greatly contributing to the ultimate properties of the cured system. Cure time of an epoxy system is dependent upon the reactivity of the amine hydrogen atoms. While the attached organic molecule takes no direct part in the chemical reaction, it does influence how readily the amine hydrogen atoms leave the nitrogen and react with the glycidyl oxygen atom. Thus, cure time is set by the kinetics of the particular amine used in the hardener. Cure time for any given epoxy system can only be altered by adding an accelerator in systems that can accommodate one, or by changing the temperature and mass of the resin/hardener mix. Adding more hardener will not "speed things up" and adding less will not "slow things down."

The epoxy curing reaction is exothermic. The rate at which an epoxy resin cures is dependent upon the curing temperature. The warmer it is the faster it goes. The cure rate will vary by about half or double with each 18° F. (10° C.) change in temperature. For example, if an epoxy system takes 3 hours to become tack free at 70° F., it will be tack free in 1.5 hours at 88° F. or tack free in 6 hours at 52° F. Everything to do with the speed of the reaction follows this general rule. Pot life and working time are greatly influenced by the initial temperature of the mixed resin and hardener. On a hot day for example, the two materials can be cooled before mixing in order to increase the working time.

The gel time of the resin is the time it takes for a given mass held in a compact volume to solidify. Gel time depends on the initial temperature of the mass and follows the above rule. One hundred grams (about three fluid ounces) of Silver Tip Laminating Epoxy with Fast Hardener (as an illustrative example) will solidify in 25 minutes starting at 77° F.; at 60° F. the gel time is about 50 minutes. If the same mass were spread over 4 square feet at 77° F. the gel time would be a little over three hours. Cure time is surface area/mass sensitive in addition to being temperature sensitive.

As the reaction proceeds it gives off heat. If the heat generated is immediately dissipated to the environment (as occurs in thin films) the temperature of the curing resin does not rise and the reaction speed proceeds at a uniform pace. If the resin is confined (as in a mixing pot) the exothermic reaction raises the temperature of the mixture, accelerating the reaction.

Working time or Work Life (WL) of an epoxy formulation is about 75% of the gel time for the geometry of the pot. It can be lengthened by increasing the surface area, working with a smaller mass, or cooling the resin and hardener prior to mixing. Material left in the pot will increase in absolute viscosity (measured at 75° F., for example) due to polymerization but initially decrease in apparent viscosity due to heating. Material left in the pot to 75% of gel time may appear quite thin (due to heating) but will actually be quite thick when cooled to room temperature. Experienced users either mix batches that will be applied almost immediately or increase the surface area to slow the reaction.

Although the cure rate of an epoxy is dependent upon temperature, the curing mechanism is independent of temperature. The reaction proceeds most quickly in the liquid state. As the cure proceeds, the system changes from a liquid to a sticky, viscous, soft gel. After gelation the reaction speed slows down as hardness increases. Chemical reactions proceed more slowly in the solid state. From the soft sticky gel the system gets harder, slowly losing its stickiness. It becomes tack free and continues to become harder and stronger as time passes.

At normal temperatures, the system will reach about 60 to 80% of ultimate strength after 24 hours. Curing then proceeds slowly over the next several weeks, finally reaching a point where no further curing will occur without a significant increase in temperature. However, for most purposes room temperature cured systems can be considered fully cured after 72 hours at 77° F. High modulus systems like Phase Two epoxy, for example, must be post-cured at elevated temperatures to reach full cure.

It is usually more efficient to work with as fast a cure time as practical for the application at hand if the particular system being used offers this choice. This allows the user to move along to the next phase without wasting time waiting for the epoxy to cure. Faster curing films with shorter tack times will have less chance to pick up fly tracks, bugs, and other airborne contaminants.

Epoxy resin compositions generally comprise a first liquid part comprising an epoxy resin and a second liquid part comprising a curing agent. Although the first and second part are liquids at ambient temperature, the liquid parts can comprise solid components dissolved or dispersed within the liquid.

The first part of the two-part composition comprises at least one epoxy resin. Epoxy resins are low molecular weight monomers or higher molecular weight polymers which typically contain at least two epoxide groups. An epoxide group is a cyclic ether with three ring atoms, also sometimes referred to as a glycidyl or oxirane group. Epoxy resins are typically liquids at ambient temperature.

Various epoxy resins are known including for example a bisphenol A type epoxy resin, a bisphenol F type epoxy resin, a bisphenol S type epoxy resin, a phenol novolac type epoxy resin, an alkyl phenol novolac type epoxy resin, a cresol novolac type epoxy resin, a biphenyl type epoxy resin, an aralkyl type epoxy resin, a cyclopentadiene type epoxy resin, a naphthalene type epoxy resin, a naphthol type epoxy resin, an epoxy resin of condensate of phenol and aromatic aldehyde having a phenolic hydroxy group, a biphenyl aralkyl type epoxy resin, a fluorene type epoxy resin, a Xanthene type epoxy resin, a triglycidyl isocianurate, a rubber modified epoxy resin, a phosphorous based epoxy resin, and the like.

Blends of various epoxy-containing materials can also be utilized. Suitable blends can include two or more weight average molecular weight distributions of epoxy-containing compounds such as low molecular weight epoxides (e.g., having a weight average molecular weight below 200 g/mole), intermediate molecular weight epoxides (e.g., having a weight average molecular weight in the range of about 200 to 1000 g/mole), and higher molecular weight epoxides (e.g., having a weight average molecular weight above about 1000 g/mole). Alternatively, or additionally, the epoxy resin can contain a blend of epoxy-containing materials having different chemical natures such as aliphatic and aromatic or different functionalities such as polar and nonpolar.

In one embodiment, the first part of the two-part composition comprises at least one bisphenol (e.g., A) epoxy resin. Bisphenol (e.g., A) epoxy resins are formed from reacting epichlorohydrin with bisphenol A to form diglycidyl ethers of bisphenol A. The simplest resin of this class is formed from reacting two moles of epichlorohydrin with one mole of bisphenol A to form the bisphenol A diglycidyl ether (commonly abbreviated to DGEBA or BADGE). DGEBA resins are transparent colorless-to-pale-yellow liquids at ambient temperature, with viscosity typically in the range of 5-15 Pa s at 25° C. Industrial grades normally contain some distribution of molecular weight, since pure DGEBA shows a strong tendency to form a crystalline solid upon storage at ambient temperature. This same reaction can be conducted with other bisphenols, such as bisphenol F. The choice of the epoxy resin used depends upon the end use for which it is intended. Epoxides with flexibilized backbones may be desired where a greater amount of ductility is needed in the bond line. Materials such as diglycidyl ethers of bisphenol A and diglycidyl ethers of bisphenol F can provide desirable structural adhesive properties that these materials attain upon curing, while hydrogenated versions of these epoxies may be useful for compatibility with substrates having oily surfaces.

Aromatic epoxy resins can also be prepared by reaction of aromatic alcohols such as biphenyl diols and triphenyl diols and triols with epichlorohydrin. Such aromatic biphenyl and triphenyl epoxy resins are not bisphenol epoxy resins.

There are two primary types of aliphatic epoxy resins, i.e., glycidyl epoxy resins and cycloaliphatic epoxides. Glycidyl epoxy resins are typically formed by the reaction of epichlorohydrin with aliphatic alcohols or polyols to give glycidyl ethers or aliphatic carboxylic acids to give glycidyl esters. The resulting resins may be monofunctional (e.g., dodecanol glycidyl ether), difunctional (diglycidyl ester of hexahydrophthalic acid), or higher functionality (e.g. trimethylolpropane triglycidyl ether). Cycloaliphatic epoxides contain one or more cycloaliphatic rings in the molecule to which the oxirane ring is fused (e.g., 3,4-epoxycyclohexylmethyl-3,4-epoxycyclohexane carboxylate). They are formed by the reaction of cyclo-olefins with a peracid, such as peracetic acid. These aliphatic epoxy resins typically display low viscosity at ambient temperature (10-200 mPa s) and are often used as reactive diluents. As such, they are employed to modify (reduce) the viscosity of other epoxy resins. This has led to the term "modified epoxy resin" to denote those containing viscosity-lowering reactive diluents. In some embodiments, the resin composition may further comprise a reactive diluent. Examples of reactive diluents include diglycidyl ether of 1, 4 butanediol, diglycidyl ether of cyclohexane dimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N,N', N',-tetraglycidyl meta-xylylene diamine, and vegetable oil polyglycidyl ether. The resin composition may comprise at least 1, 2, 3, 4, or 5 wt.-% and typically no greater than 15 or 20 wt-% of such reactive diluent(s).

In some embodiments, the resin composition comprises (e.g., bisphenol A) epoxy resin in an amount of at least about 50 wt.-% of the total resin composition including the mixture of boron nitride particles and cellulose nanocrystals. In some embodiments, the amount of (e.g., bisphenol A) epoxy resin is no greater than 95, 90, 80, 85, 80, 75, 70, or 65 wt.-% of the total resin composition.

Epoxies are typically cured with stoichiometric or near-stoichiometric quantities of curative. In the case of two-part epoxy compositions, the second part comprises the curative, also referred to herein as the curing agent. The equivalent weight or epoxide number is used to calculate the amount of co-reactant (hardener) to use when curing epoxy resins. The epoxide number is the number of epoxide equivalents in 1 kg of resin (eq/kg); whereas the equivalent weight is the weight in grams of resin containing 1 mole equivalent of epoxide (g/mol). Equivalent weight (g/mol)=1000/epoxide number (eq/kg).

Common classes of curatives for epoxy resins include amines, amides, ureas, imidazoles, and thiols. In typical embodiments, the curing agent comprises reactive —NH groups or reactive —NR$^1$R$^2$ groups wherein R$^1$ and R$^2$ are independently H or C$_1$ to C$_4$ alkyl, and most typically H or methyl.

The curing agent is typically highly reactive with the epoxide groups at ambient temperature. Such curing agents are typically a liquid at ambient temperature. However, the first curing agent can also be a solid provided it has an activation temperature at or below ambient temperature.

One class of curing agents are primary, secondary, and tertiary polyamines. The polyamine curing agent may be straight-chain, branched, or cyclic. In some favored embodiments, the polyamine crosslinker is aliphatic. Alternatively, aromatic polyamines can be utilized.

Useful polyamines are of the general formula R$^5$—(NR$^1$R$^2$)$_x$ wherein R$^1$ and R$^2$ are independently H or alkyl, R$^5$ is a polyvalent alkylene or arylene, and x is at least two. The alkyl groups of R$^1$ and R$^2$ are typically C$_1$ to C$_{18}$ alkyl, more typically C$_1$ to C$_4$ alkyl, and most typically methyl. R$^1$ and R$^2$ may be taken together to form a cyclic amine. In some embodiment x is two (i.e. diamine). In other embodiments, x is 3 (i.e. triamine). In yet other embodiments, x is 4.

Examples include hexamethylene diamine; 1,10-diaminodecane; 1,12-diaminododecane; 2-(4-aminophenyl)ethylamine; isophorone diamine; 4,4'-diaminodicyclohexylmethane; and 1,3-bis(aminomethyl)cyclohexane. Illustrative six-member ring diamines include for example piperzine and 1,4-diazabicyclo[2.2.2]octane ("DABCO").

Other useful polyamines include polyamines having at least three amino groups, wherein the three amino groups are primary, secondary, or a combination thereof. Examples include 3,3'-diaminobenzidine, hexamethylene triamine, and triethylene tetramine.

The specific composition of the epoxy resin can be selected based on its intended end use. For example, in one embodiment, the resin composition can be for insulation, as described in US 2014/0080940, the disclosure of which is incorporated herein by reference thereto.

The resin composition may optionally further comprise additives including (e.g. silane-treated or untreated) fillers, anti-sag additives, thixotropes, processing aids, waxes, and UV stabilizers. Examples of typical fillers include glass bubbles, fumed silica, mica, feldspar, and wollastonite. In some embodiments, the resin composition further comprises other thermally conductive fillers such as aluminum oxide, aluminum hydroxide, fused silica, zinc oxide, aluminum nitride, silicon nitride, magnesium oxide, beryllium oxide, diamond, and copper.

Methyl Methacrylates (MMA) Adhesives

Methyl methacrylate (MMA) adhesives of example embodiments can include one-part and two-part MMA adhesives. One-part MMA adhesives can include a resin. Two-part methyl methacrylates (MMA) adhesives have a faster strength build up than epoxies. MMA adhesives are commonly used for bonding plastics and bonding metals to plastics. They are also extremely effective in joining solid surface materials together, and as they can be colored, they are used extensively in worktop manufacture and installation.

Methyl methacrylate adhesives are structural acrylic adhesives that are made of a Part A (Part 1) resin and Part B (Part 2) hardener. Most MMAs also contain rubber and additional strengthening agents. MMAs cure quickly at room temperature and have full bond strength soon after application. The adhesive is resistant to shear, peel, and impact stress. Looking at the bonding process more technically, these adhesives work by creating an exothermic polymerization reaction. Polymerization is the process of reacting monomer molecules together, in a chemical reaction, to form polymer chains. What this means is that the adhesives create a strong bond while still being flexible. These adhesives can form bonds between dissimilar materials with different flexibility, like metal and plastic. Unlike some other structural adhesives like two-part epoxies, MMAs do not require heat to cure. There are MMAs available with a range of working times to suit your specific needs.

MMAs have higher peel strength and are more temperature resistant. They develop strength faster allowing parts to be used sooner. It is also worth noting the different processing conditions used for MMAs. For example, the two components of MMAs can each be applied separately to one of the materials being bonded together, and the MMA will not begin to cure until the joints are brought together, combining the components. This means that you do not have to deal with precise mixing ratios to get a good bond. It is important to remember that MMAs do tend to have a strong smell, meaning you should have good ventilation when applying them and they are flammable, so some care is needed.

MMAs are formulated to have a Work Life between 5 minutes and 20 minutes.

All these acrylic structural adhesive types provide exceptional bond strength and durability—nearly that of epoxy adhesives—but with the advantages of having faster cure speed, being less sensitive to surface preparation, and bonding more types of materials.

Silicone Adhesives

Silicone adhesives of example embodiments can include one-part and two-part silicone adhesives. Two-part silicone adhesives are generally used when there is a large bond area or when there is not enough relative humidity to complete the cure. Common applications for these are electronics applications including the manufacture of household appliances, in automotive and window manufacture.

Suitable silicone resins include moisture-cured silicones, condensation-cured silicones, and addition-cured silicones, such as hydroxyl-terminated silicones, silicone rubber, and fluoro-silicone. Examples of suitable commercially available silicone PSA compositions comprising silicone resin include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), PSA 529, PSA 750-D1, PSA 825-D1, and PSA 800-C. An example of two-part silicone resin commercially available is that sold under the trade designation "SILASTIC J" from Dow Chemical Company, Midland, Mich.

Pressure sensitive adhesives (PSAs) can include natural or synthetic rubbers such as styrene block copolymers (styrene-butadiene; styrene-isoprene; styrene-ethylene/butylene block copolymers); nitrile rubbers, synthetic polyisoprene, ethylene-propylene rubber, ethylene-propylene-diene monomer rubber (EPDM), polybutadiene, polyisobutylene, butyl rubber, styrene-butadiene random copolymers, and combinations thereof.

Additional pressure sensitive adhesives include poly(alpha-olefins), polychloroprene, and silicone elastomers. In some embodiments, polychloroprene and silicone elastomers may be preferred since polychloroprene contains a halogen, which can contribute towards flame resistance, and silicone elastomers are resistant to thermal degradation.

Urethane Adhesives

Example urethane adhesives as used in embodiments can include both one-part and two-part urethane adhesives. Two-part urethane adhesives can be formulated to have a wide range of properties and characteristics when cured. They are often used when bonding dissimilar materials such as glass to metal or aluminum to steel, for example.

Most polyurethane adhesives are either polyester or polyether based. They are present in the isocyanate prepolymers and in the active hydrogen containing hardener component (polyol). They form the soft segments of the urethane, whereas the isocyanate groups form the hard segments. The soft segments usually comprise the larger portion of the elastomeric urethane adhesive and, therefore, determine its physical properties. For example, polyester-based urethane adhesives have better oxidative and high temperature stability than polyether-based urethane adhesives, but they have lower hydrolytic stability and low-temperature flexibility. However, polyethers are usually more expensive than polyesters.

Many urethane adhesives are sold as two-component urethane adhesives. The first component contains the diisocyanates and/or the isocyanate prepolymers (Part 1), and the second consists of polyols (and amine/hydroxyl chain extenders) (Part 2). A catalyst is often added, usually a tin salt or a tertiary amine, to speed up cure. The reactive ingredients are often blended with additives, and plasticizers to achieve the desired processing and/or final properties, and to reduce cost.

Polyurethanes may be prepared, for example, by the reaction of one or more polyols and/or polyamines and/or aminoalcohols with one or more polyisocyanates, optionally in the presence of non-reactive component(s). For applications where weathering is likely, it is typically desirable for the polyols, polyamines, and/or aminoalcohols and the polyisocyanates to be free of aromatic groups.

Suitable polyols include, for example, materials commercially available under the trade designation DESMOPHEN from Bayer Corporation, Pittsburgh, Pa. The polyols can be polyester polyols (for example, Desmophen 631A, 650A, 651A, 670A, 680, 110, and 1150); polyether polyols (for example, Desmophen 550U, 1600U, 1900U, and 1950U); or acrylic polyols (for example, Demophen A160SN, A575, and A450BA/A).

Suitable polyamines include, for example: aliphatic polyamines such as, for example, ethylene diamine, 1,2-diaminopropane, 2,5-diamino-2,5-dimethylhexane, 1,11-diaminoundecane, 1,12-diaminododecane, 2,4- and/or 2,6-hexahydrotoluylenediamine, and 2,4'-diaminodicyclohexylmethane; and aromatic polyamines such as, for example, 2,4- and/or 2,6-diaminotoluene and 2,4'- and/or 4,4'-diaminodiphenylmethane; amine-terminated polymers such as, for example, those available from Huntsman Chemical (Salt Lake City, Utah), under the trade designation JEFFAMINE polypropylene glycol diamines (for example, Jeffamine XTJ-510) and those available from Noveon Corp., Cleveland, Ohio, under the trade designation Hycar ATBN (amine-terminated acrylonitrile butadiene copolymers), and those disclosed in U.S. Pat. No. 3,436,359 (Hubin et al.) and U.S. Pat. No. 4,833,213 (Leir et al.) (amine-terminated polyethers, and polytetrahydrofuran diamines); and combinations thereof.

Suitable aminoalcohols include, for example, 2-aminoethanol, 3-aminopropan-1-ol, alkyl-substituted versions of the foregoing, and combinations thereof.

Suitable polyisocyanate compounds include, for example: aromatic diisocyanates (for example, 2,6-toluene diisocyanate; 2,5-toluene diisocyanate; 2,4-toluene diisocyanate; m-phenylene diisocyanate; p-phenylene diisocyanate; methylene bis(o-chlorophenyl diisocyanate); methylenediphenylene-4,4'-diisocyanate; polycarbodiimide-modified methylenediphenylene diisocyanate; (4,4'-diisocyanato-3,3',5,5'-tetraethyl) diphenylmethane; 4,4'-diisocyanato-3,3'-dimethoxybiphenyl (o-dianisidine diisocyanate); 5-chloro-2,4-toluene diisocyanate; and 1-chloromethyl-2,4-diisocyanato benzene), aromatic-aliphatic diisocyanates (for example, m-xylylene diisocyanate and tetramethyl-m-xylylene diisocyanate); aliphatic diisocyanates (for example, 1,4-diisocyanatobutane; 1,6-diisocyanatohexane; 1,12-diisocyanatododecane; and 2-methyl-1,5-diisocyanatopentane); cycloaliphatic diisocyanates (for example, methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), polymeric or oligomeric compounds (for example, polyoxyalkylene, polyester, polybutadienyl, and the like) terminated by two isocyanate functional groups (for example, the diurethane of toluene-2,4-diisocyanate-terminated polypropylene oxide glycol); polyisocyanates commercially available under the trade designation MONDUR or DESMODUR (for example, Desmodur XP7100 and Desmodur N 3300A) from Bayer Corporation (Pittsburgh, Pa.); and combinations thereof.

In some embodiments, the polyurethane comprises a reaction product of components comprising at least one polyisocyanate and at least one polyol. In some embodiments, the polyurethane comprises a reaction product of components comprising at least one polyisocyanate and at least one polyol. In some embodiments, the at least one polyisocyanate comprises an aliphatic polyisocyanate. In some embodiments, the at least one polyol comprises an aliphatic polyol. In some embodiments, the at least one polyol comprises a polyester polyol or a polycarbonate polyol.

Typically, the polyurethane(s) is/are extensible and/or pliable. For example, the polyurethane(s), or any layer containing polyurethane, may have a percent elongation at break (at ambient conditions) of at least 10, 20, 40, 60, 80, 100, 125, 150, 175, 200, 225, 250, 275, 300, 350, or even at least 400 percent, or more.

In certain embodiments, the polyurethane has hard segments, typically segments corresponding to one or more polyisocyanates, in any combination, in an amount of from 35, 40, or 45 percent by weight up to, 50, 55, 60, or even 65 percent by weight.

As used herein: wt % means percent by weight based on the total weight of material, and Hard Segment wt %=(weight of short chain diol and polyol+weight of short chain di- or polyisocyanate)/total weight of resin wherein:
short chain diols and polyols have an equivalent weight≤185 g/eq, and a functionality≥2; and
short chain isocyanates have an equivalent weight≤320 g/eq and a functionality≥2.

One or more catalysts are typically included with two-part urethanes. Catalysts for two-part urethanes are well known and include, for example, aluminum-, bismuth-, tin-, vanadium-, zinc-, tin-, and zirconium-based catalysts. Tin-based catalysts have been found to significantly reduce the amount of outgassing during formation of the polyurethane. Examples of tin-based catalysts include dibutyltin compounds such as dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. If present, any catalyst is typically included at levels of at least 200 parts per million by weight (ppm), 300 ppm, or more; however, this is not a requirement.

Additional suitable two-part urethanes are described in U.S. Pat. No. 6,258,918 B1 (Ho et al.) and U.S. Pat. No. 5,798,409 (Ho), the disclosures of which are incorporated herein by reference.

In general, the amounts of polyisocyanate to polyol, polyamine, and/or aminoalcohol in a two-part urethane are selected in approximately stoichiometrically equivalent amounts, although in some cases it may be desirable to adjust the relative amounts to other ratios. For example, a slight stoichiometric excess of the polyisocyanate may be useful to ensure a high degree of incorporation of the polyol, polyamine, and/or aminoalcohol, although any excess isocyanate groups present after polymerization will typically react with materials having reactive hydrogens (for example, adventitious moisture, alcohols, amines, etc.).

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. This disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A dispenser system comprising:
one or more dispenser components comprising one or more sensors for providing at least one process parameter of a dispensable material, the one or more sensors comprising
(i) a temperature sensor comprising a probe arranged in a fluid path of the dispensable material and configured to sense a temperature of the dispensable material; and
(ii) a conductivity sensor configured to sense a conductivity of the dispensable material;
a processor operatively coupled to the one or more dispenser components, the processor configured to:
receive at least one parameter associated with the dispenser system;
determine a value for an operational parameter of the dispenser system, based on the at least one parameter, that will achieve a flow rate of a dispensable material in the dispenser system;

provide the operational parameter;

receive the temperature of the dispensable material from the temperature sensor;

receive a sensed conductivity of the dispensable material from the conductivity sensor;

determine a state of cure of the dispensable material based on the sensed temperature of the dispensable material and the sensed conductivity of the dispensable material adjust the value for the operational parameter of the dispenser system based on the sensed temperature and state of cure; and provide the adjusted operational parameter.

2. The dispenser system of claim 1, wherein the operational parameter is driving force pressure of the dispenser system.

3. The dispenser system of claim 1, wherein either: (i) the probe is configured to directly contact the dispensable material in the fluid path; or (ii) the temperature sensor further comprises a shield to separate an outer surface of the probe from the dispensable material and the probe is configured to sense the temperature of the dispensable material through the shield.

4. The dispenser system of claim 1, wherein the temperature sensor comprises the conductivity sensor and wherein the temperature sensor is further configured to apply a voltage to the dispensable material in the fluid path of the dispensable material.

5. The dispenser system of claim 1, wherein the at least one parameter of the dispenser system comprises a density of the dispensable material:

the one or more sensors further comprises a mass measurement device configured to sense mass data of the dispensable material;

the at least one process parameter comprises the mass data; and the processor is further configured to determine a volumetric flow of the dispensable material based on the density of the dispensable material and the mass data of the dispensable material.

6. The dispenser system of claim 1, wherein the processor is further configured to:

determine a maximum idle time or a purge time for the one or more dispenser components based on the at least one parameter and the at least one process parameter; and provide the maximum idle time or the purge time.

7. The dispenser system of claim 6, wherein the one or more sensors are further configured to provide at least one environmental parameter and the processor is further configured to determine the maximum idle time or the purge time based on the at least one environmental parameter, the at least one parameter, and the at least one process parameter.

8. The dispenser system of claim 6, further comprising a user interface operatively coupled to the processor and wherein the processor is further configured to:

receive one or more user inputs comprising one or more of a safety factor, a process control factor, and a waste factor; and determine the maximum idle time or the purge time based on the one or more user inputs, the at least one parameter, and the at least one process parameter.

9. The dispenser system of claim 1, wherein the processor is configured to provide the operational parameter and the adjusted operational parameter to the one or more dispenser components.

10. The dispenser system of claim 1, wherein the dispensable material comprises an adhesive.

11. A method of dispensing a dispensable material using a dispenser system, the method comprising:

receiving at least one parameter associated with the dispenser system;

determining a value for an operational parameter of the dispenser system, based on the at least one parameter, that will achieve a flow rate of the dispensable material in the dispenser system;

providing the operational parameter;

receiving at least one process parameter comprising a sensed temperature of the dispensable material;

receiving a sensed conductivity of the dispensable material from a conductivity sensor;

determining a state of cure of the dispensable material based on the sensed temperature of the dispensable material and the sensed conductivity of the dispensable material; and adjusting the value for the operational parameter of the dispenser system based on the sensed temperature and the state of cure; and providing the adjusted operational parameter.

12. The method of claim 11, wherein the operational parameter is a driving force pressure of the dispenser system.

13. The method of claim 11, wherein the at least one parameter of the dispenser system comprises a density of the dispensable material, and wherein the at least one process parameter further comprises mass data of the dispensable material and wherein the method further comprises determining a volumetric flow of the dispensable material based on the density of the dispensable material and the mass data of the dispensable material.

14. The method of claim 11, further comprising:

determining a maximum idle time or a purge time for one or more dispenser components of the dispenser system based on the at least one parameter and the at least one process parameter; and providing the maximum idle time or the purge time.

15. The method of claim 14, further comprising:

receiving at least one environmental parameter provided by one or more sensors; and determining the maximum idle time or the purge time based on the at least one environmental parameter, the at least one parameter, and the at least one process parameter.

16. The method of claim 14, further comprising:

receiving one or more user inputs comprising one or more of a safety factor, a process control factor, and a waste factor; and determining the maximum idle time or the purge time based on the one or more user inputs, the at least one parameter, and the at least one process parameter.

17. The method of claim 11, further comprising providing the operational parameter and the adjusted operational parameter to one or more dispenser components of the dispenser system.

18. The method of claim 11, wherein the dispensable material comprises adhesive.

* * * * *